United States Patent
Morioka

(10) Patent No.: US 9,622,166 B2
(45) Date of Patent: Apr. 11, 2017

(54) WIRELESS COMMUNICATIONS SYSTEM AND METHOD

(75) Inventor: Yuichi Morioka, Reading (GB)

(73) Assignee: SCA IPLA HOLDINGS INC, New York, NY (US)

(*) Notice: Subject to any disclaimer, the term of this patent is extended or adjusted under 35 U.S.C. 154(b) by 230 days.

(21) Appl. No.: 14/122,049

(22) PCT Filed: Jun. 13, 2012

(86) PCT No.: PCT/GB2012/051331
§ 371 (c)(1),
(2), (4) Date: Nov. 25, 2013

(87) PCT Pub. No.: WO2012/172325
PCT Pub. Date: Dec. 20, 2012

(65) Prior Publication Data
US 2014/0086141 A1 Mar. 27, 2014

(30) Foreign Application Priority Data

Jun. 14, 2011 (GB) .................................. 1109983.5

(51) Int. Cl.
*H04W 40/22* (2009.01)
*H04W 52/02* (2009.01)
*H04W 40/08* (2009.01)

(52) U.S. Cl.
CPC ........... *H04W 52/02* (2013.01); *H04W 40/08* (2013.01); *H04W 40/22* (2013.01); *Y02B 60/50* (2013.01)

(58) Field of Classification Search
None
See application file for complete search history.

(56) References Cited

U.S. PATENT DOCUMENTS

| 5,903,618 A * | 5/1999 | Miyake ................. H04W 88/02 370/337 |
| 2003/0063607 A1* | 4/2003 | Adachi ................. H04W 88/04 370/389 |

(Continued)

FOREIGN PATENT DOCUMENTS

| CN | 101978739 A | 2/2011 |
| EP | 2 237 611 | 10/2010 |

(Continued)

OTHER PUBLICATIONS

Great Britain Search Report Issued Oct. 6, 2011 in Application No. GB 1109983.5 Filed Jun. 14, 2011.

(Continued)

*Primary Examiner* — Anh-Vu Ly
*Assistant Examiner* — Hector Reyes Ortiz
(74) *Attorney, Agent, or Firm* — Oblon, McClelland, Maier & Neustadt, L.L.P.

(57) ABSTRACT

A wireless communications system includes a base station, a plurality of intermediate devices and a terminal device. The base station is operable to wirelessly transmit downlink signals to the terminal device, the downlink signals including terminal control signals identifying one of the intermediate devices as a target device to which the terminal device is to direct uplink signals intended for the base station. The terminal device wirelessly transmits the uplink signals to the base station via the intermediate device identified by the terminal control signals. In this way, downlink communications may be provided directly from the base station to the terminal device, including control signals which instruct the terminal device where to send uplink data. This enables the base station to directly control scheduling of uplink communications, and in particular to define the uplink route from (Continued)

the terminal device to the base station via one or more intermediate devices.

31 Claims, 16 Drawing Sheets

(56) References Cited

U.S. PATENT DOCUMENTS

| | | | |
|---|---|---|---|
| 2004/0192204 A1* | 9/2004 | Periyalwar | H04W 52/46 |
| | | | 455/25 |
| 2007/0160014 A1* | 7/2007 | Larsson | H04B 7/022 |
| | | | 370/338 |
| 2007/0201392 A1 | 8/2007 | Ramachandran | |
| 2007/0206500 A1* | 9/2007 | Mollah | H04B 7/2606 |
| | | | 370/235 |
| 2008/0025280 A1 | 1/2008 | Hsu et al. | |
| 2008/0070582 A1* | 3/2008 | Cai | H04B 7/15542 |
| | | | 455/450 |
| 2008/0209299 A1* | 8/2008 | Chang | H04L 1/1854 |
| | | | 714/748 |
| 2008/0227461 A1* | 9/2008 | Dayal | H04L 1/0025 |
| | | | 455/452.2 |
| 2008/0285499 A1* | 11/2008 | Zhang | H04B 7/155 |
| | | | 370/315 |
| 2009/0116420 A1* | 5/2009 | Jeong | H04B 7/2606 |
| | | | 370/312 |
| 2010/0067417 A1 | 3/2010 | Zhou et al. | |
| 2010/0158142 A1 | 6/2010 | Yu et al. | |
| 2010/0304665 A1 | 12/2010 | Higuchi | |
| 2011/0019606 A1 | 1/2011 | Umeda et al. | |
| 2011/0021193 A1* | 1/2011 | Hong | H04B 7/155 |
| | | | 455/435.1 |
| 2011/0038293 A1 | 2/2011 | Zhou et al. | |
| 2011/0038294 A1 | 2/2011 | Zhou et al. | |
| 2011/0136525 A1* | 6/2011 | Fujii | H04B 7/15592 |
| | | | 455/507 |
| 2011/0158098 A1* | 6/2011 | Daraiseh | H04W 40/02 |
| | | | 370/235 |
| 2011/0194485 A1* | 8/2011 | Horneman | H04W 72/042 |
| | | | 370/315 |
| 2011/0305191 A1 | 12/2011 | Yu et al. | |
| 2012/0176960 A1 | 7/2012 | Zhang et al. | |
| 2014/0133335 A1 | 5/2014 | Morioka | |
| 2015/0327235 A1 | 11/2015 | Morioka | |

FOREIGN PATENT DOCUMENTS

| | | |
|---|---|---|
| JP | 2002-111722 A | 4/2002 |
| JP | 2005-198111 A | 7/2005 |
| JP | 2009-177628 A | 8/2009 |
| JP | 2011-29990 A | 2/2011 |
| JP | 2014-522619 A | 9/2014 |
| KR | 10200800025925 | 3/2008 |
| WO | WO 2006/070178 A1 | 7/2006 |
| WO | 2007 053949 | 5/2007 |
| WO | 2008 020162 | 2/2008 |
| WO | 2009 109076 | 9/2009 |
| WO | 2010 024410 | 3/2010 |
| WO | 2011 020212 | 2/2011 |

OTHER PUBLICATIONS

International Search Report Issued Aug. 30, 2012 in PCT/GB12/051331 Filed Jun. 13, 2012.

U.S. Appl. No. 14/122,017, filed Nov. 25, 2013, Morioka.

U.S. Appl. No. 14/801,461, filed Jul. 16, 2015, Morioka.

Japanese Office Action issued Mar. 22, 2016 in Patent Application No. 2014-515282 (without English Translation).

Combined Chinese Office Action and Search Report issued Aug. 17, 2016 in Patent Application No. 201280024579.4 (with English translation of categories of cited documents).

Office Action issued on Nov. 1, 2016 in Japanese Patent Application No. 2014-515282.

* cited by examiner

WIRELESS COMMUNICATIONS SYSTEM AND METHOD

FIELD OF THE INVENTION

The present invention relates to a wireless communications system and method. Further aspects of the present invention relate to a base station, an intermediate device, a terminal device and a computer program.

BACKGROUND OF THE INVENTION

Machine Type Communication (MTC) is being discussed in various wireless communication standards bodies as a new trend of wireless technology of communication network applications which typically do not require human interaction.

A broad definition of MTC is an automated communication network to and from machines. One major category of MTC devices are expected to have the characteristics of very low power consumption, very small data transmissions and a very large number of terminals. An example MTC application that fits within this category may for example be energy consumption monitoring of home appliances for smart grid systems.

In order to realize these requirements, wireless PAN (Personal Area Network: 10-20 m range) standards such as ZigBee adopt Adhoc/Mesh topology where there is no central coordinating entity to control the traffic flow, and where the scheduling/routing of data transmission is managed in a distributed manner. The Mesh characteristics allow data to be conveyed beyond the PAN range by multihopping the information via a series of neighbouring devices. Because each transmission link is kept short, the power consumption per terminal is kept low.

However, in order to reliably convey information from a source to a destination, this topology encounters several problems.

Routing/Scheduling Complexity

One characteristic of Mesh topology is that there could be multiple routes from source to destination. FIG. 1 schematically illustrates a Mesh network topology. Seven terminal devices A to G are shown. In order to transfer information from terminal A to terminal G, route 1 (solid arrows) or route 2 (dashed arrows) can be taken. The arrows accompanied by question marks indicate alternative routes available for transmission from a given terminal. In particular, terminal A needs to make a decision whether to transmit its data first to terminal B (via solid arrow), or to terminal C (via dashed arrow). Terminal D needs to make a similar decision. This means that each terminal in a Mesh topology requires knowledge of the existing surrounding terminals and requires the capability to select the optimum route to a given destination, which intuitively requires significant intelligence.

Furthermore, in an energy conserving system, some terminals may be required to switch into a hibernation mode when they are not required to receive or transmit. In such a scenario, because there is no central coordinator, each terminal is required to have knowledge of when the neighbouring terminals are capable to receive information, which would impact on how they schedule transmission.

Hidden Node Problem

As described above, in a Mesh topology each terminal is required to make a decision on when to transmit data. FIG. 2 schematically illustrates how this can be problematic due to hidden nodes. In FIG. 2, four terminals A to D are shown, with the radio transmission range of terminals A and C being indicated by the circles surrounding these respective terminals. In the deployment scenario envisaged in FIG. 2, where terminal A has data to send to terminal B, and terminal C has data to send to terminal D, because terminal A is not in range of C and vice versa, there is possibility that terminals A and C may commence transmission at the same time. In this situation, a mixed signal from terminals A and C will be received at terminal B, which may inhibit decoding of the desired signal (from terminal A) at terminal B. A "listen before send" mechanism at the transmitting terminals (to observer for interfering transmissions) will not work in this case because the transmitting terminals are out of range of each other, or in other words are hidden from each other. Complex mechanisms would be required to effectively solve this hidden node problem.

Excessive Use of Resource (Medium & Energy)

The nature of the Mesh topology requires the same data to be transmitted multiple times through multiple hops. FIGS. 3A and 3B schematically illustrate how control signals are communicated from a terminal A to a terminal G, and how in response data signals are communicated from the terminal G to the terminal A. In particular, FIG. 3A illustrates a single hop scenario whereas FIG. 3B illustrates a multi-hop scenario. In FIG. 3A, the terminals A and G communicate directly with each other. Neighbouring (intermediate) terminals B, D and E are not utilised in the communication. More specifically, the terminal A sends a control signal directly to the terminal G to request data, and the terminal G responsively transmits the requested data directly back to the terminal A. The period between the transmission of the control signal from the terminal A to the reception of the data at the terminal A is referred to as the transmission time. In contrast, in FIG. 3B, the terminals A and G communicate with each other via the terminals B, D and E, in a multi-hop manner. More specifically, the terminal A sends a control signal to request data firstly to the terminal B. Terminal B then relays the control signal to the terminal D, and so on through the terminal E until the control signal is finally received at the terminal G from the terminal E. The terminal G then responsively transmits the requested data firstly to the terminal E, where it is relayed on to the terminal D and so on through the terminal B until the data is finally received at the terminal A. As with FIG. 3A, the period between the transmission of the control signal from the terminal A to the reception of the data at the terminal A is referred to as the transmission time.

As can be understood from a comparison of FIGS. 3A and 3B, not only does multi-hopping increase the latency to transfer information from source to destination, but it also has some additional side effects. One effect is, since the same data needs to be sent multiple times, it consumes more medium time than when transmitted in a single hop. Routing signals and traffic flow control signals may also be sent multiple times, making the effect more serious. This problem is particularly significant in MTC where there may be large numbers of terminals, and for which the signalling information (control signals) is likely to dominate the actual information (data) transmitted.

Also, because in a Mesh topology terminals within the route (terminals B, D & E in FIG. 3B) need to receive and transmit data and signalling that is not originated by itself, they are required to consume more energy than in a single hop network, in which they would only transmit self-originated data. These same problems (excessive use of medium) can be observed in a Relay topology or when a gateway is used.

Accordingly, it will be understood that one of the main characteristics of MTC is that terminals are expected to have extremely low power consumption. One effective way to realize this is to limit the transmission range of the MTC terminals, and to use Relay or Mesh topology to multihop the information from the MTC terminals to the base station.

However, it will also be understood from the above discussion that Relay and Mesh topologies have their own drawbacks in that each relay or mesh terminal needs to have distributed scheduling and routing capability in order to convey information in a multihop manner, which brings complexity to these terminals. Furthermore, the scheduling messages need also to be multihopped, which results in an ineffective use of the medium.

An uplink only single-hop relay is described in US2008/0285499. The mobile terminal in this case is agnostic to the relay node, that is it is not aware that its uplink data is being forwarded by the relay node. One characteristic of this transparent operation is that the relay node only transmits towards the base station (eNB), and never to the mobile terminal (UE). This creates some problems. For example, this arrangement will not work with a Type 1 relay of the sort that is being standardized in 3GPP. Additionally, there is no way to enforce per link automatic repeat requests (ARQ). There is no way to compensate for additional uplink delay caused by two or more hops. Also, there is no way to measure downlink channel quality between individual multihop links.

SUMMARY OF THE INVENTION

According to the present invention there is provided a wireless communications system comprising:
a base station;
a plurality of intermediate devices; and
a terminal device; wherein
the base station is operable to wirelessly transmit downlink signals to the terminal device, the downlink signals comprising terminal control signals identifying one of the intermediate devices as a target device to which the terminal device is to direct uplink signals intended for the base station; and
the terminal device is operable to wirelessly transmit the uplink signals to the base station via the intermediate device identified by the terminal control signals.

In this way, downlink communications are provided directly from the base station to the terminal device, including control signals which instruct the terminal device where to send uplink data. This enables the base station to directly control scheduling of uplink communications, and in particular to define the uplink route from the terminal device to the base station via one or more intermediate devices. Preferably, the base station is operable to wirelessly transmit the downlink signals directly to the terminal device. There is no problem with the base station communicating directly with the terminal device on the downlink, because there is no requirement to conserve power at the base station. Power is conserved at the terminal device on the uplink because a lower power transmission can be used which although insufficient to reach the base station is able to reach the intermediate device. The terminal device is not required to determine the uplink path itself and therefore does not require complex, expensive and power consuming control logic.

In other words, in order to mitigate the conflicting requirements set out in the above background, a method to use a Relay and/or Mesh topology for uplink transmission to conserve power at MTC terminals, while using conventional Star topology in the downlink transmission where there is sufficient transmission power at the base station is proposed.

The base station may be operable to wirelessly transmit intermediate control signals to an intermediate device via which the uplink signals are to be routed, the intermediate control signals indicating either another of the intermediate devices or the base station as a target device to which that intermediate device is to direct the uplink signals. In this case, the intermediate device is operable to wirelessly transmit the uplink signals to the intermediate device or base station identified by the intermediate control signals. In this way, the base station directly selects all of the radio links in the chain between the terminal device and the base station.

The base station may be operable to wirelessly transmit to the intermediate device an indication that it is required to receive the uplink signals. This indication may specify a radio resource at which the intermediate device can expect the uplink signals to be transmitted to the intermediate device by the terminal device or by another intermediate device. This may allow the receiving intermediate device to switch into a "relaying" mode (from a dormant mode for example) and to decode information from the correct radio resources.

When the uplink signals are to be routed via more than one intermediate device, the base station may be operable to wirelessly transmit intermediate control signals to a first intermediate device via which the uplink signals are to be routed, the intermediate control signals indicating a second intermediate device as a target device to which the first intermediate device is to direct the uplink signals. In this case, the first intermediate device is operable to wirelessly transmit the uplink signals to the second intermediate device identified by the intermediate control signals.

The terminal control signals may comprise scheduling information having more than one address field, the address fields comprising a transmitter address field identifying the terminal device and a receiver address field identifying the intermediate device via which the uplink signals are to be transmitted. The intermediate control signals may also comprise scheduling information having more than one address field, the address fields comprising a transmitter address field identifying the first intermediate device and a receiver address field identifying the second intermediate device. The address fields may be radio network temporary identifiers (RNTIs) specified on a physical downlink control channel (PDCCH) broadcast by the base station. It may not be necessary to provide two address fields in the scheduling information to the intermediate device from which the base station is to directly receive uplink signals. This is because it may be considered implicit that in the absence of the second address the uplink data is to be transmitted to the base station providing the scheduling information.

The intermediate devices may be operable to generate respective predetermined beacon signals. The terminal device may then receive a beacon signal from an intermediate device and generate a respective measure of the radio link quality between the terminal device and the intermediate device using the received beacon signal. The terminal device then transmits the measure of radio link quality to the base station within the uplink signals. The terminal device may receive the beacon signals from plural intermediate devices and generate, for each radio link between the terminal device and one of the intermediate devices from which a beacon signal has been received, a respective measure of the radio link quality using the received beacon signals. Again, the terminal device may then transmit the respective measures of radio link quality to the base station within the uplink signals. The base station may then determine a transmission route from the terminal device to the base station via one or more of the intermediate devices in dependence on the received measures of radio link quality.

One or more of the base station, the intermediate devices and the terminal device may be operable to generate respective predetermined beacon signals. Another one or more of the base station, the intermediate devices and the terminal device receive the beacon signals and generates a respective measure of the radio link quality corresponding to the radio link via which the beacon signal has been transmitted using the received beacon signals. The another one or more of the base station, the intermediate devices and the terminal device may then transmit the measure of radio link quality to the base station within the uplink signals, whereupon the base station is able to determine a transmission route from the terminal device to the base station via one or more of the intermediate devices in dependence on the measures of radio link quality.

In this way, the various devices within the network are able to discover neighbouring devices and the quality of radio links with those neighbouring devices. The base station is able to receive all of this information to determine a suitable route through the network for uplink data. It will be appreciated that it may not be necessary for all devices to transmit beacon signals, particularly where certain radio links are fixed geographically.

The control signals may comprise scheduling information, the scheduling information specifying one or more of a transmission power, data rate, transmission frequency, transmission timeslot and number of resource blocks for the uplink signals. The scheduling information may be set by the base station for each radio link based on the radio link quality measure reported for each radio link.

The base station may broadcast an indication of the radio resource over which each beacon signal is transmitted.

The uplink signals from the terminal device may comprise uplink control signals indicating a radio link quality between the terminal device and neighbouring devices. The base station may then set one or more of an uplink route from the terminal device to the base station via one or more of the intermediate devices and transmission control parameters for controlling the transmission of data from each device in the uplink route in dependence on the received uplink control signals.

In one embodiment, the intermediate devices generate respective predetermined beacon signals. The terminal device receives a beacon signal from an intermediate device and generates a respective measure of the radio link quality between the terminal device and the intermediate device using the received beacon signals. The terminal device then transmits the measure of radio link quality to the intermediate device. The intermediate device may then relay the measure of radio link quality to the base station.

In an embodiment, in response to receiving uplink data signals from the terminal device via one or more intermediate devices, the base station is configured to transmit a first acknowledgement message to the intermediate device from which the uplink signals have been directly received, and to transmit a second acknowledgement message directly to the terminal device. The intermediate device from which the uplink signals have been directly received retains the uplink signals until the first acknowledgement message has been received at the intermediate device, and the terminal device retains the uplink signals until the second acknowledgement message has been received at the terminal device.

The base station may determine a delay budget for uplink data transmission based on the number of intermediate devices via which uplink data transmissions from the terminal device to the base station are to be routed. The base station can use the determined delay budget to set a time-out period after which an uplink signal transmitted from the terminal device to the base station can be assumed to be lost.

The intermediate devices may be dedicated relays, other terminal devices or a combination of the two (that is, some of the intermediate devices may be dedicated relays while other of the intermediate devices may be terminal devices). The terminal device transmitting uplink signals to the base station may in some embodiments serve as an intermediate device in relation to uplink communications from another terminal device to the base station.

The terminal devices may be machine type communication (MTC) devices. The downlink signals may comprise data signals.

According to another aspect of the present invention, there is provided a base station for wirelessly communicating data to and from a terminal device via one or more of a plurality of intermediate devices within a wireless communications system, the base station comprising:

a transmitter configured to wirelessly transmit downlink signals to the terminal device, the downlink signals comprising control signals indicating one of the intermediate devices as a target device to which the terminal device is to direct uplink signals intended for the base station; and a receiver configured to receive uplink signals transmitted from the terminal device via the intermediate device indicated by the control signals.

According to another aspect of the present invention, there is provided a terminal device for wirelessly communicating data to and from a base station via one or more of a plurality of intermediate devices within a wireless communications system, the terminal device comprising:

a receiver configured to wirelessly receive, from the base station, downlink signals, the downlink signals comprising terminal control signals indicating one of the intermediate devices as a target device to which the terminal device is to direct uplink signals intended for the base station; and a transmitter configured to wirelessly transmit the uplink signals to the base station via the intermediate device indicated by the terminal control signals.

According to another aspect of the present invention, there is provided an intermediate device for wirelessly relaying data between a base station and a terminal device within a wireless communications system, the intermediate device comprising:

a receiver configured to wirelessly receive, from the base station, intermediate control signals indicating another intermediate device or a base station as a target device to which the intermediate device is to direct uplink signals intended for the base station; and to wirelessly receive, from the terminal device or from another intermediate device, the uplink signals intended for the base station; and a transmitter configured to wirelessly transmit the received uplink signals to the intermediate device or the base station indicated by the terminal control signals.

According to another aspect of the present invention, there is provided a method of wirelessly communicating data between a base station and a terminal device via one or more of a plurality of intermediate devices, comprising:

wirelessly transmitting, from the base station, downlink signals to the terminal device, the downlink signals comprising terminal control signals indicating one of the intermediate devices as a target device to which the terminal device is to direct uplink signals intended for the base station; and wirelessly transmitting, from the terminal device, the uplink signals to the base station via the intermediate device indicated by the terminal control signals.

According to another aspect of the present invention, there is provided a method of wirelessly communicating data between a base station and a terminal device via one or more of a plurality of intermediate devices within a wireless communications system, comprising:

wirelessly transmitting downlink signals from the base station to the terminal device, the downlink signals comprising terminal control signals indicating one of the intermediate devices as a target device to which the terminal device is to direct uplink signals intended for the base station; and receiving, at the terminal device, uplink signals transmitted from the terminal device via the intermediate device indicated by the terminal control signals.

According to another aspect of the present invention, there is provided a method of wirelessly communicating data between a terminal device and a base station via one or more of a plurality of intermediate devices within a wireless communications system, comprising:

wirelessly receiving at the terminal device, from the base station, downlink signals, the downlink signals comprising terminal control signals indicating one of the intermediate devices as a target device to which the terminal device is to direct uplink signals intended for the base station; and wirelessly transmitting the uplink signals from the terminal device to the base station via the intermediate device indicated by the terminal control signals.

According to another aspect of the present invention, there is provided a method of wirelessly relaying data between a base station and a terminal device within a wireless communications system, comprising:

wirelessly receiving at an intermediate device, from the base station, intermediate control signals indicating another intermediate device or the base station as a target device to which the intermediate device is to direct uplink signals intended for the base station;

wirelessly receiving at the intermediate device, from the terminal device or from another intermediate device, the uplink signals intended for the base station; and wirelessly transmitting the received uplink signals to the intermediate device or the base station indicated by the intermediate control signals.

A computer program and a recording medium for implementing the invention are also envisaged.

According to yet another aspect of the present invention there is provided a wireless communications system comprising:

a base station; and a plurality of terminal devices; wherein the base station is operable to wirelessly transmit downlink signals directly to a first one of the terminal devices; and the first terminal device is operable to wirelessly transmit the uplink signals to the base station via a second one of the terminal devices.

In this way, an asymmetric uplink/downlink mesh network can be provided. A corresponding base station, terminal device and method are also envisaged.

Further aspects and features of the present invention are defined in the appended claims.

BRIEF DESCRIPTION OF THE DRAWINGS

Example embodiments of the present invention will now be described with reference to the accompanying drawings in which like parts have the same designated references and in which.

DESCRIPTION OF EXAMPLE EMBODIMENTS

Figure 1:
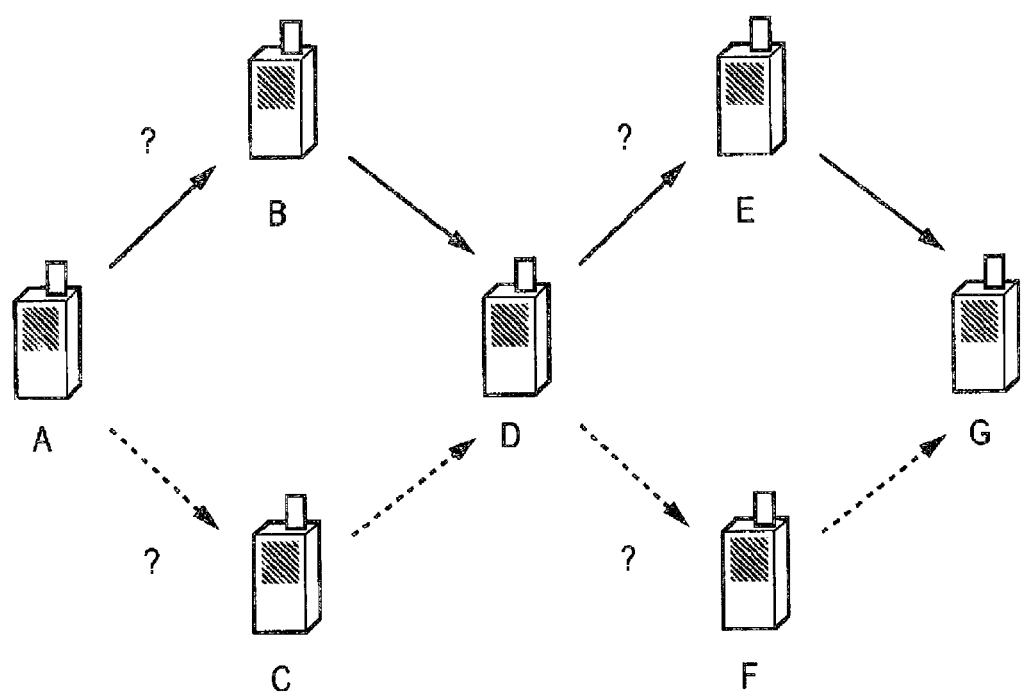
FIG. 1 schematically illustrates a mesh network having multiple possible transmission routes.
Figure 2:
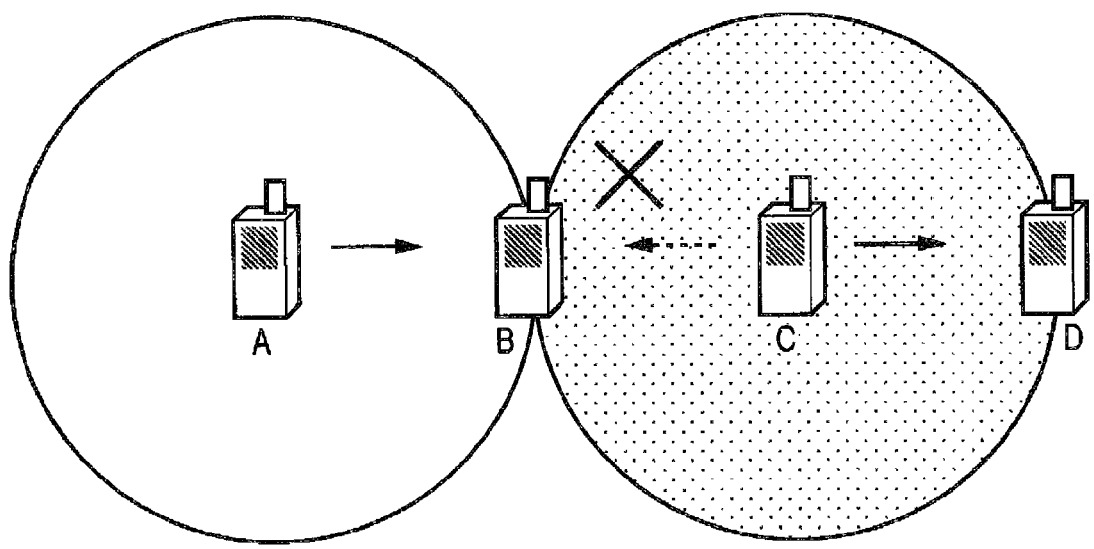
FIG. 2 schematically illustrates a "hidden node" problem in a mesh network.
Figure 3A:
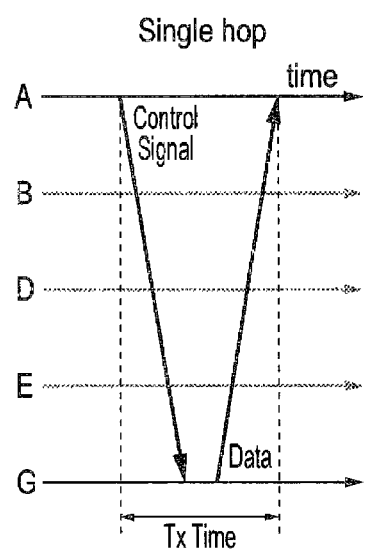
FIGS. 3A and 3B provide a comparison of resource consumption in single hop and multi-hop transmissions.
Figure 3B:
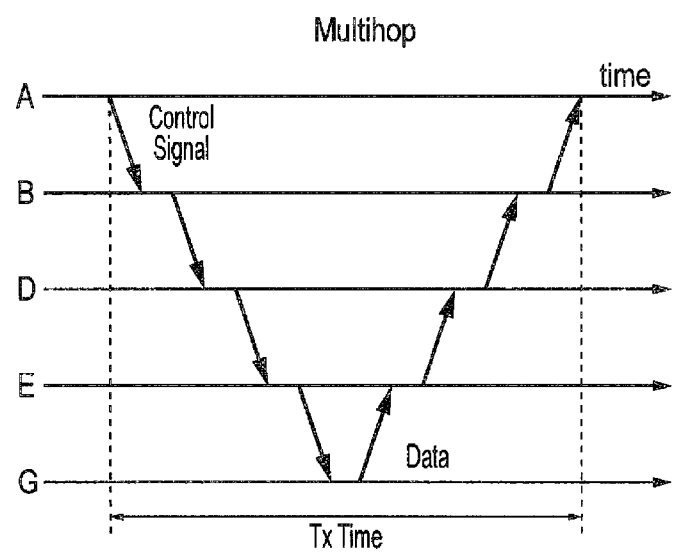
Figures 4A, 4B:
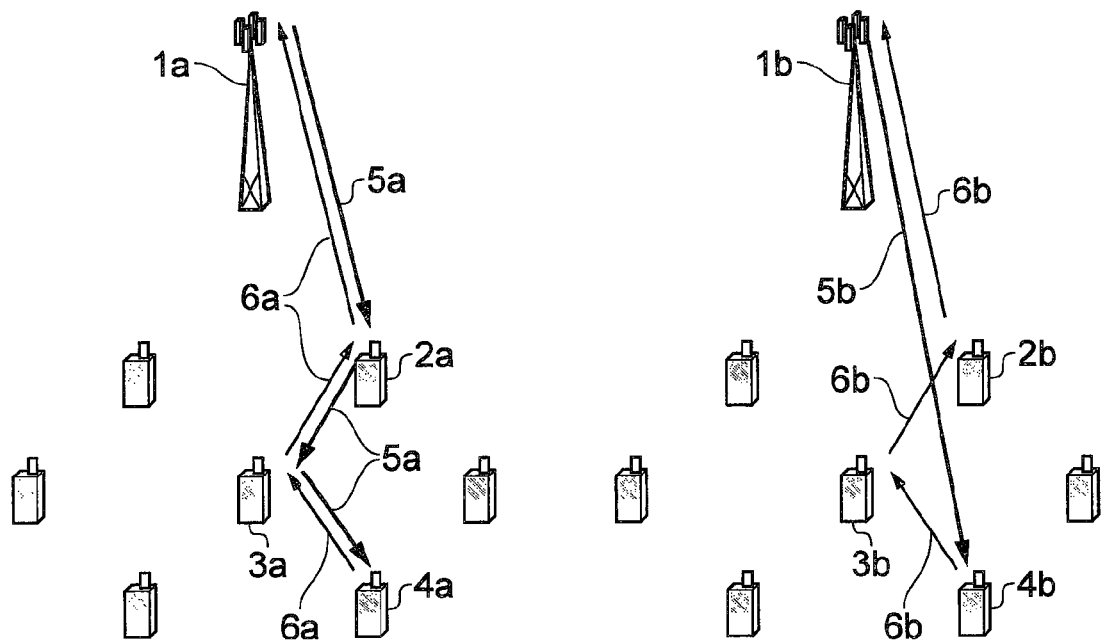
FIGS. 4A and 4B provide a comparison between a symmetric uplink/downlink multi-hop signalling scenario and an asymmetric uplink/downlink signalling scenario.

Referring first to FIGS. 4A and 4B, these provide a comparison between a symmetric uplink/downlink multi-hop signalling scenario and an asymmetric uplink/downlink signalling scenario. FIG. 4A illustrates a symmetric uplink/downlink case in which communications are multi-hopped both on a downlink 5a from a base station 1a to a terminal device 4a via intermediate devices 2a and 3a, and also on an uplink 6a from the terminal device 4a to the base station 1a via the intermediate devices 2a and 3a. FIG. 4B illustrates an asymmetric uplink/downlink case in which communications are direct on a downlink 5b from a base station 1b to a terminal device 4b, but are multi-hopped on an uplink 6b from the terminal device 4b to the base station 1b via intermediate devices 2b and 3b.

Figures 5A, 5B:
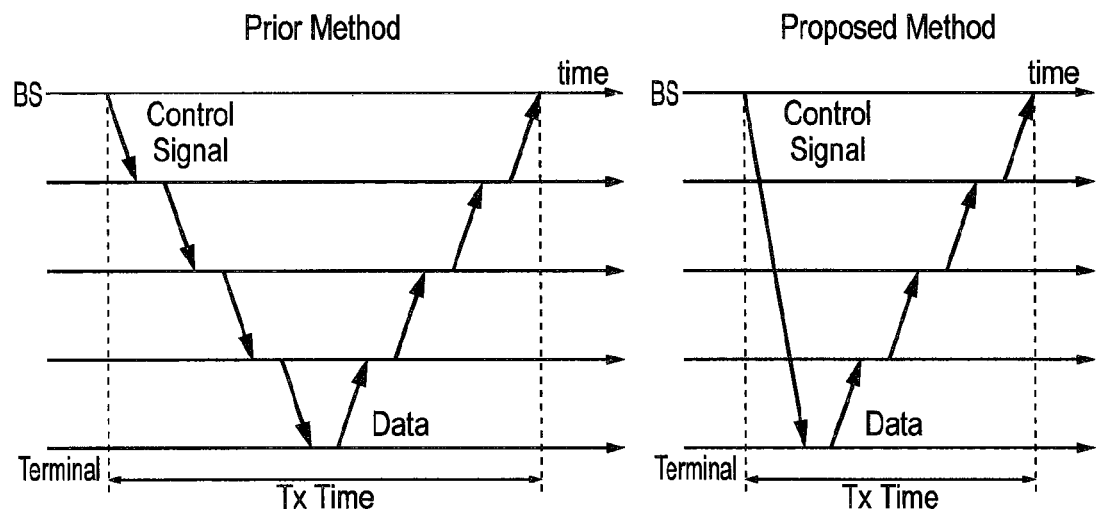
FIGS. 5A and 5B provide a comparison of resource consumption for the two scenarios shown in FIGS. 4A and 4B respectively.

Referring now to FIGS. 5A and 5B, the impact of the asymmetric uplink/downlink scenario on the resource consumption and transmission time/medium time (time during which a radio link is in use conveying signalling and/or data) become clear. As discussed previously, multi-hopping permits lower power transmissions to be used, but increases transmission time and medium time. FIG. 5A illustrates how the multi-hopping of both the control signal and the data signal (as conducted in FIG. 4A) take a relatively long time to be conveyed, due to the processing delay on reception/retransmission at each intermediate step in the route. In contrast, FIG. 5B shows how the transmission time/medium time is reduced in relation to the control signal sent from the base station (BS) to the terminal by transmitting the control signal in a single hop. While on the face of it this goes against the low transmission power goals of a mesh/relay type network, in reality the base station will not be subject to the same transmission power constraints as the terminal device and relays within the network. Moreover, this arrangement is particularly advantageous for MTC devices because of the relatively high volume of control signalling versus data signalling which is typically utilised for this type of device.

Figure 6B:
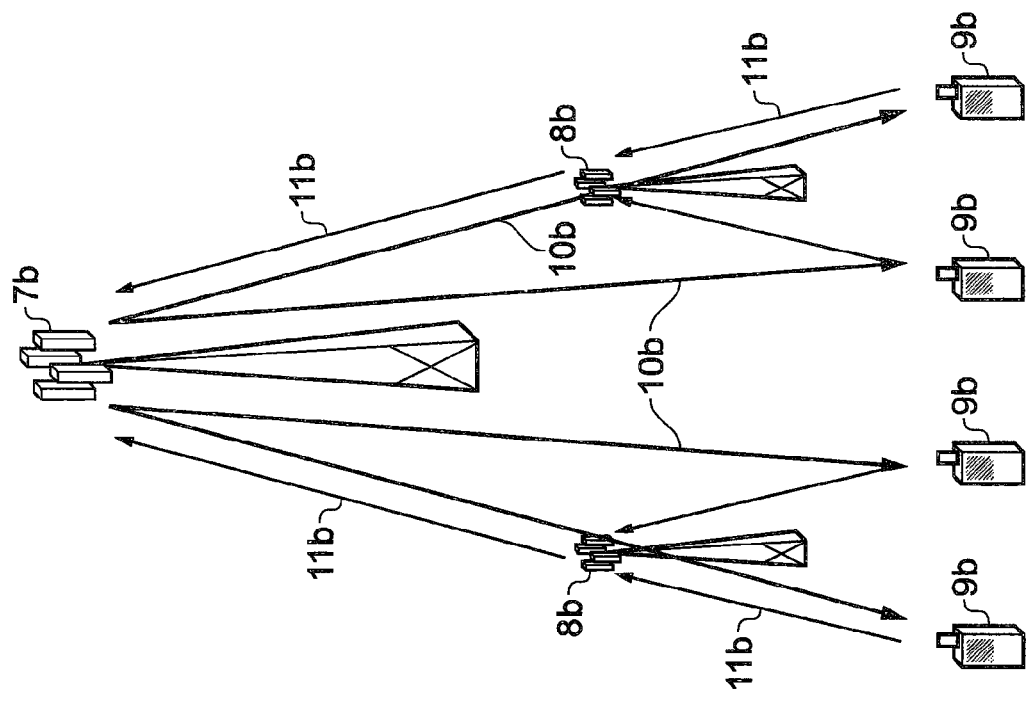
FIGS. 6A and 6B provide a comparison of the symmetric uplink/downlink multi-hop signalling scenario and the asymmetric uplink/downlink signalling scenario when applied to a relay network.
Figure 6A:
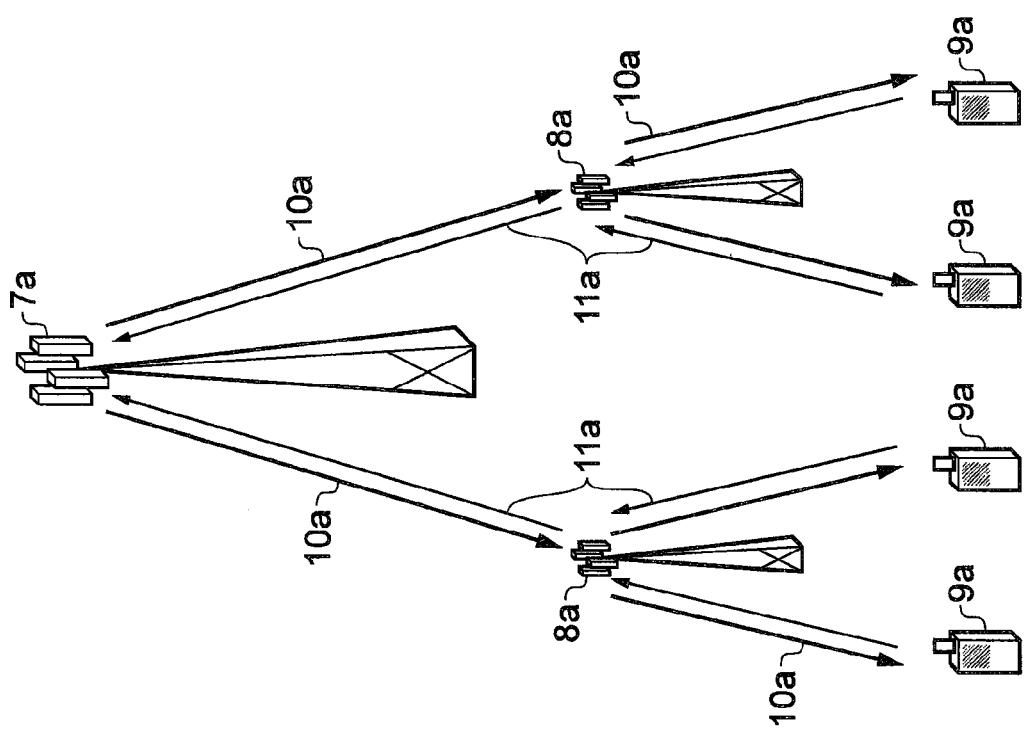

Referring next to FIGS. 6A and 6B, a comparison of the symmetric uplink/downlink multi-hop signalling scenario and the asymmetric uplink/downlink signalling scenario when applied to a relay network is provided. FIG. 6A illustrates a symmetric uplink/downlink case in which communications are multi-hopped both on a downlink 10a from a base station 7a to several terminal devices 9a via relay nodes 8a, and also on an uplink 11a from the terminal devices 9a to the base station 7a via the relay nodes 8a. FIG. 6B illustrates an asymmetric uplink/downlink case in which communications are direct on a downlink 10b from a base station 7b to a terminal device 9b, but are multi-hopped on an uplink 11b from the terminal device 9b to the base station 7b via the relay nodes 8b. It will be appreciated that the asymmetric uplink/downlink relay configuration of FIG. 6B will receive similar benefits as the asymmetric uplink/downlink mesh network configuration of FIG. 4B. In effect the intermediate devices of the mesh network correspond to relays in terms of functionality. A typical difference between the two arrangements might be that the relay would not originate data, may have a higher transmission power capability, and may be static (immobile) or semi-static (for example fixed in place on a train).

Figure 7:
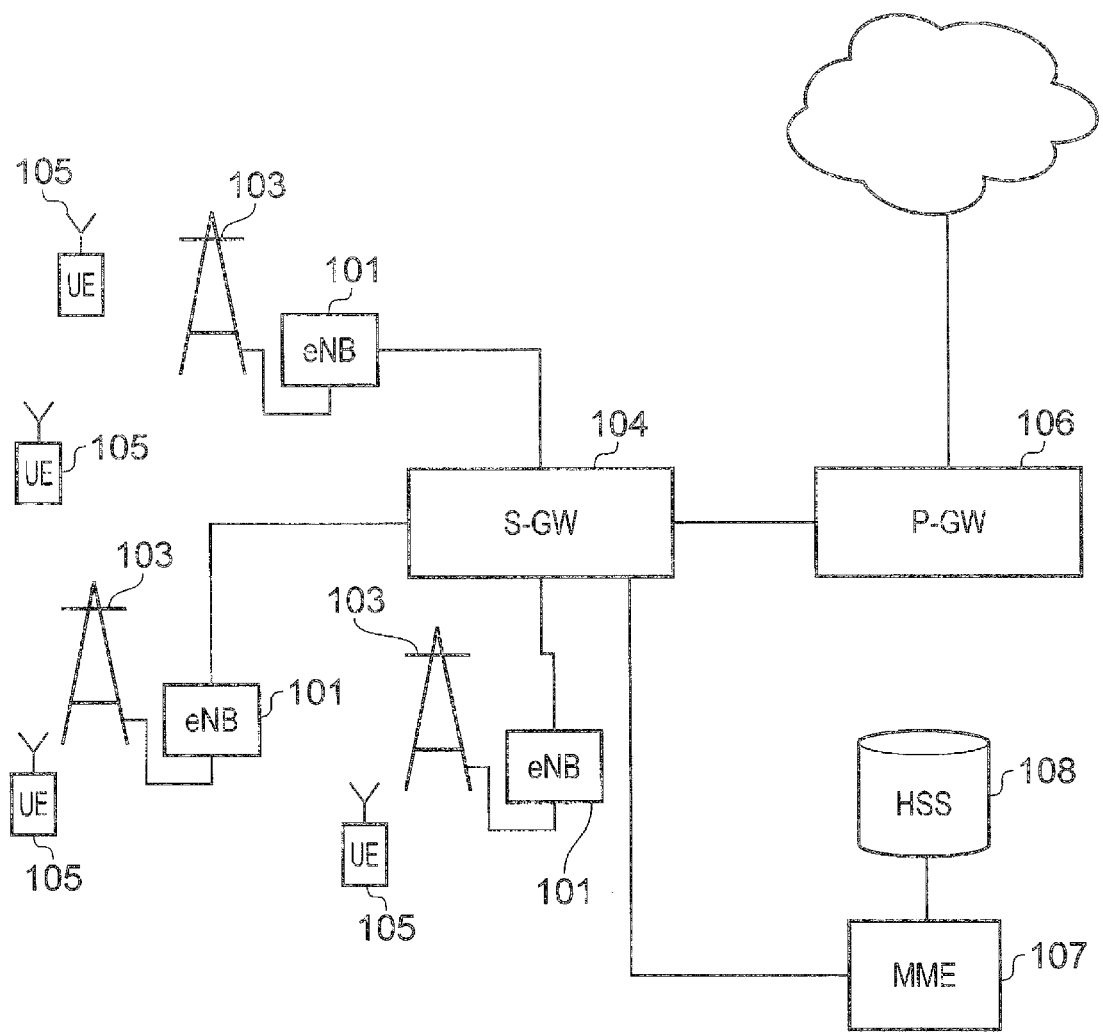
FIG. 7 is a schematic block diagram of a mobile communications network and mobile communications devices forming a communication system which operates in accordance with the 3GPP Long Term Evolution (LTE) standard.

Certain embodiments of the present invention will now be described with reference to an implementation which uses a mobile communications network operating in accordance with the 3GPP Long Term Evolution (LTE) standard. FIG. 7 is a schematic block diagram of a mobile communications network and mobile communications devices forming a communication system which operates in accordance with the 3GPP Long Term Evolution (LTE) standard. The mobile network includes a plurality of base stations known in the art as enhanced Node-Bs 101 (eNBs) each of which includes a transceiver unit 103 enabling communication of data to and from a plurality of mobile communication devices 105 via a radio interface. Each mobile communication device 105 includes a transceiver for communicating data to and from the eNBs and a USIM which uniquely identifies the mobile communication device.

Each eNB 101 provides a coverage area (i.e. a cell) and communicates data to and from mobile communication devices 102 within the coverage area/cell. Each eNB 101 is connected to a Serving Gateway (S-GW) 104 which routes user data to and from the eNBs 101 and supports mobility when mobile communication devices 105 handover between eNBs 101 as is known in the art.

The mobile network is typically divided into a number of tracking areas each of which comprise a number of eNBs. Together the tracking areas form a network coverage area providing access to the Public Land Mobile Network (PLMN) over a geographic area. The S-GW 104 is connected to a Packet Data Network Gateway 106 (P-GW) which is the network entity from which packet data is routed into and routed out of the network. The mobile telecommunication network also includes a Mobility Management Entity 107 (MME) connected to the S-GW 104 and the eNBs 101. The MME 107 is responsible for authenticating mobile communication devices 105 attempting to access the network by retrieving subscriber profile information stored in a Home Subscriber Server 108 (HSS). The MME 107 also tracks the location of each mobile communication device 105 that has joined the network. The eNBs grouped together form a radio network part of the PLMN and the infrastructure equipment of the PLMN, namely the S-GW, MME and P-GW form a core network part of the PLMN.

Figure 8:
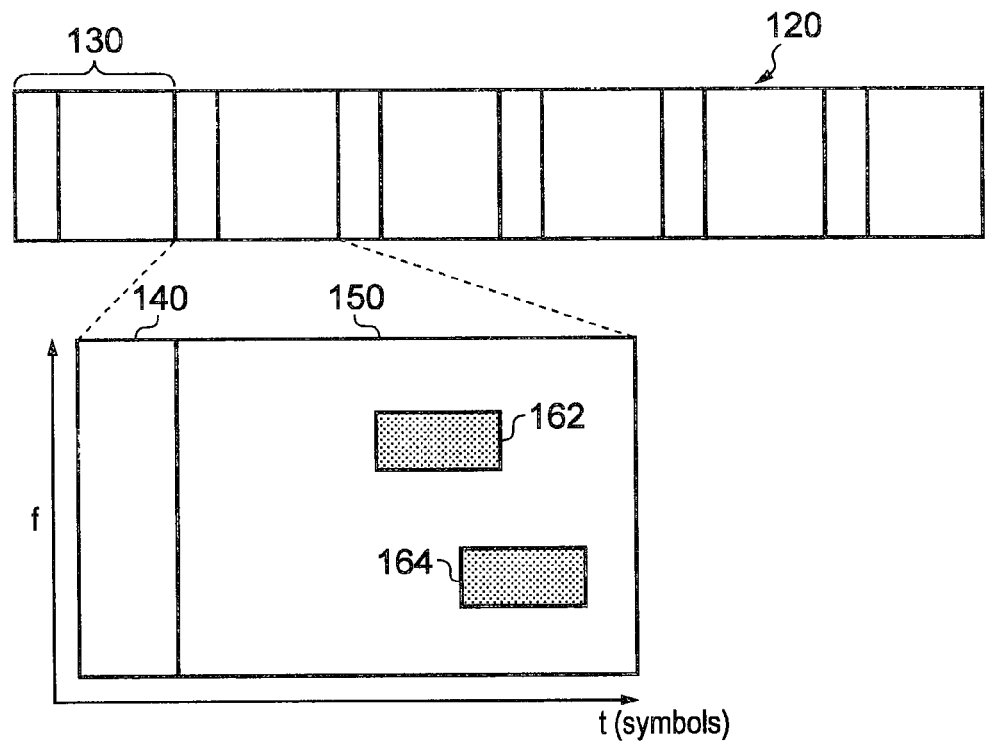
FIG. 8 schematically illustrates an example downlink data and control channel structure for use in the network shown in FIG. 7.

FIG. 8 schematically illustrates an example downlink data and control channel structure for use in the LTE based network of FIG. 7. According to the LTE standard, a physical down-link frame is used to communicate control signalling and data on the downlink (base station to terminal device). FIG. 8 is a somewhat simplified form of this, for example a LTE frame usually includes 10 sub-frames but only 6 sub-frames 130 have been represented for the downlink frame 120 of FIG. 8. Below the representation of the LTE frame 120 in FIG. 8 is an expanded version of one of the sub-frames 130. In each sub-frame 130, a Physical Downlink Control Channel (PDCCH) 140 is shown which occupies some time and frequency resources within a resource zone that stretches across the entire frequency band (vertical) and across 1 to 3 symbols in the time axis (horizontal), where the time and frequency resources are usually distributed within that zone based on a random or pseudo-random algorithm. In contrast the Physical Downlink Shared CHannel (PDSCH) 150 is comprised of a plurality of time and frequency resources which are allocated via the PDCCH. In effect, the PDCCH provides the mobile communications devices with the resource allocations and the corresponding addressing information (for example the radio network temporary identifier—RNTI). A mobile communications device can therefore, based on the RNTI, know which resource allocations it should decode to receive data intended for (addressed to) it. The data may be either data for this mobile communications device only or for all mobile communications devices in the cell. In FIG. 8, two resource blocks 162, 164 are highlighted. These could be allocated to a particular terminal device by control information provided in the PDCCH 140 in association with the RNTI of that particular terminal device. The terminal device would then know to decode data transmitted in that frequency/symbol allocation.

Figure 9:
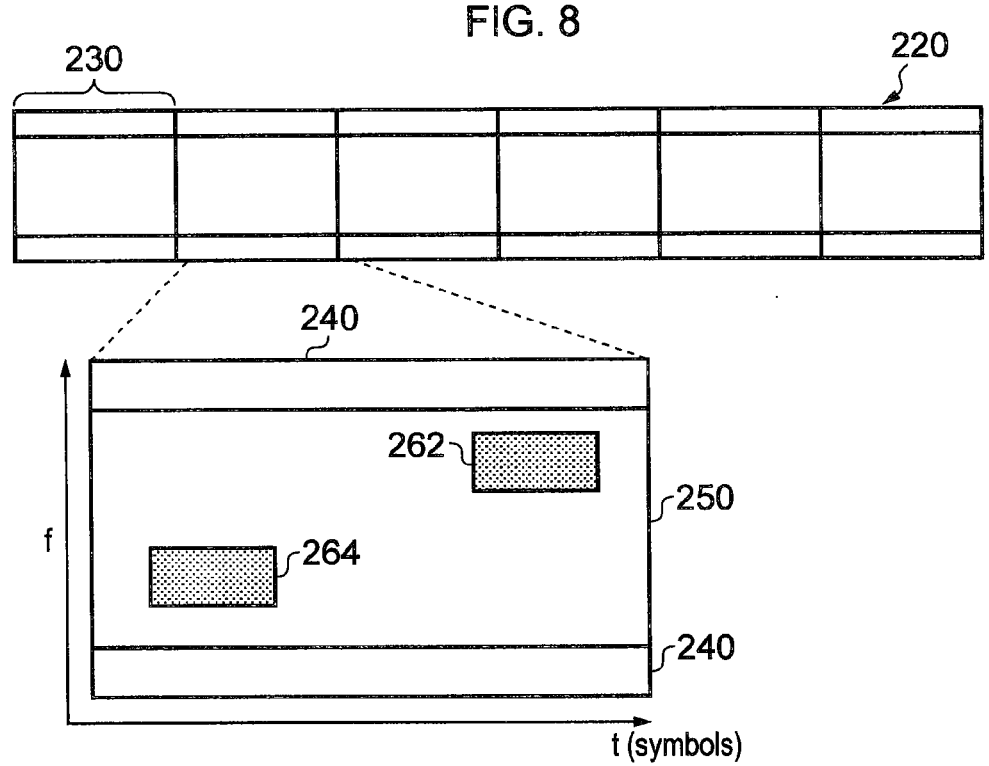
FIG. 9 schematically illustrates an example uplink data and control channel structure for use in the network shown in FIG. 7.

In similar fashion, FIG. 9 schematically illustrates an example uplink data and control channel structure for use in the network shown in FIG. 7. As with the uplink-side, a physical up-link frame 220 is used to communicate control signalling and data on the uplink (terminal device to base station). Again, as with FIG. 8, FIG. 9 is a somewhat simplified form of this. In FIG. 9, the physical up-link frame 220 is divided into sub-frames 230. Below the representation of the LTE frame 220 in FIG. 9 is an expanded version of one of the sub-frames 230. In each sub-frame 230, a Physical Uplink Control Channel (PUCCH) 240 is shown which occupies some time and frequency resources within two resource zones that stretches across the entire time (symbol) band (horizontal) and across a portion of the upper and lower extremities of the frequency band (vertical). In contrast the Physical Up-link Shared CHannel (PUSCH) 250 is comprised of a plurality of time and frequency resources which are allocated via the PDCCH (in the downlink frame). The PDCCH therefore provides the mobile communications devices with the resource allocations and the corresponding addressing information (for example the radio network temporary identifier—RNTI) for the transmitting as well as receiving control signalling and data. A mobile communications device can therefore, based on the RNTI, know which resource allocations it should transmit data on. In FIG. 9, two resource blocks 262, 264 are highlighted. These could be allocated to a particular terminal device by control information provided in the PDCCH 240 in association with the RNTI of that particular terminal device. The terminal device would then know to transmit data using that frequency/symbol allocation.

In a multi-hop network configuration, it is desirable to be able to select the best route for communicating data. In some cases this may be the route having the cleanest channel conditions (highest quality radio link), and in other cases this may be the route having adequate channel conditions but a fewer number of hops. For example, data communications requiring a greater degree of reliability may favour high quality channel conditions while data communications requiring a low latency (transmission delay) may prefer to limit the number of intermediate stages in the transmission. Furthermore, the quality of the radio links may have an impact on the time/frequency resources to be allocated to a transmission (for example, a number of resource blocks within the PUSCH), or the encoding type/rate and transmission power which should be used. In order to achieve this, the quality of each radio link is measured and reported back to the base station.

Figure 10:
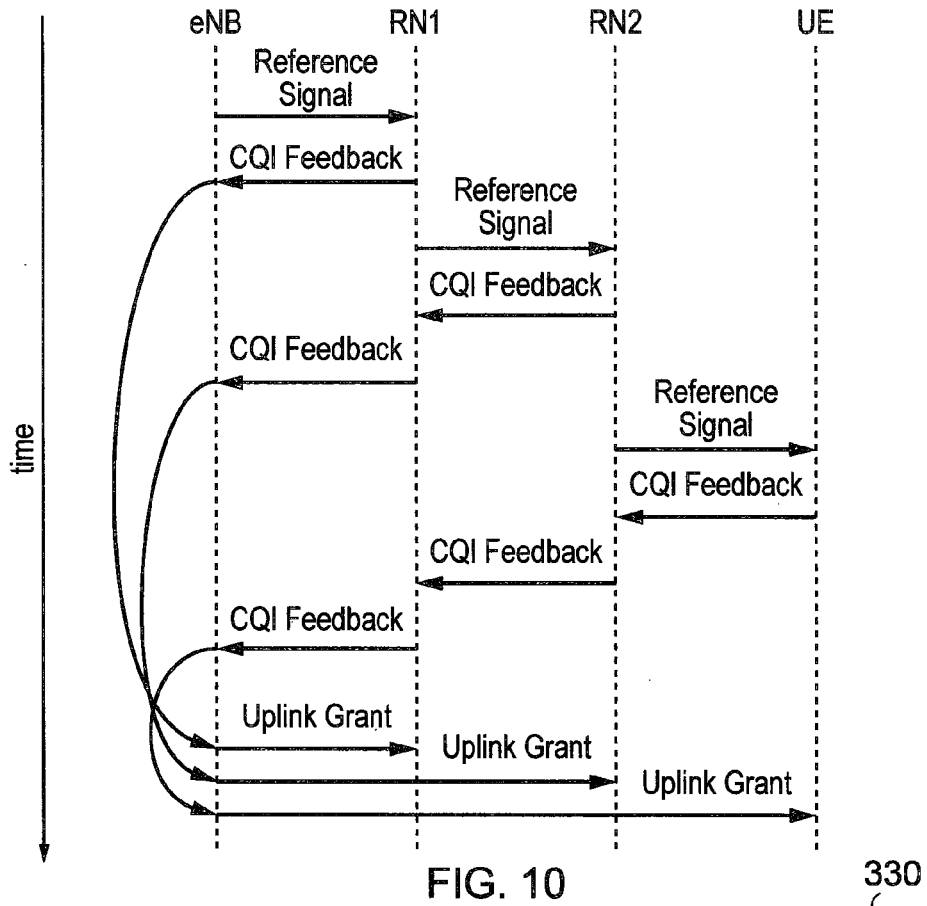
FIG. 10 schematically illustrates an example signal flow for transmitting and receiving beacon signals, and allocating uplink resources in dependence on the result.

FIG. 10 schematically illustrates an example signal flow for transmitting and receiving beacon signals, and allocating uplink resources in dependence on the result. In FIG. 10, each of the base station (eNB) and first and second relay nodes (RN1, RN2) transmit predetermined beacon (reference) signals. The reference signal from eNB is received by the first relay node RN1, measured, and channel quality information (CQI) is fed back to the eNB. The reference signal from the first relay node RN1 is received by the second relay node RN2, measured, and channel quality information (CQI) is fed back to the eNB via the first relay node RN1. Finally, the reference signal from the second relay node RN2 is received by the terminal device (UE), measured, and channel quality information (CQI) is fed back to the eNB via the second relay node RN2 and the first relay node RN1. The channel quality information may be transmitted to the base station as control signalling within the PUCCH. The channel quality information received at the base station (eNB) is then used to allocate uplink grants for the respective radio links. As can be seen from FIG. 10, the respective uplink grants are then transmitted (as control signalling in the PDCCH) directly to the respective relay nodes and the terminal device. In this way, the uplink grants for each hop of the route can be tailored to complement the channel conditions at each hop.

It will be appreciated that the same principles could be applied to a mesh network, in which at least some terminal devices serve as relays in relation to other terminal devices.

Figure 11:
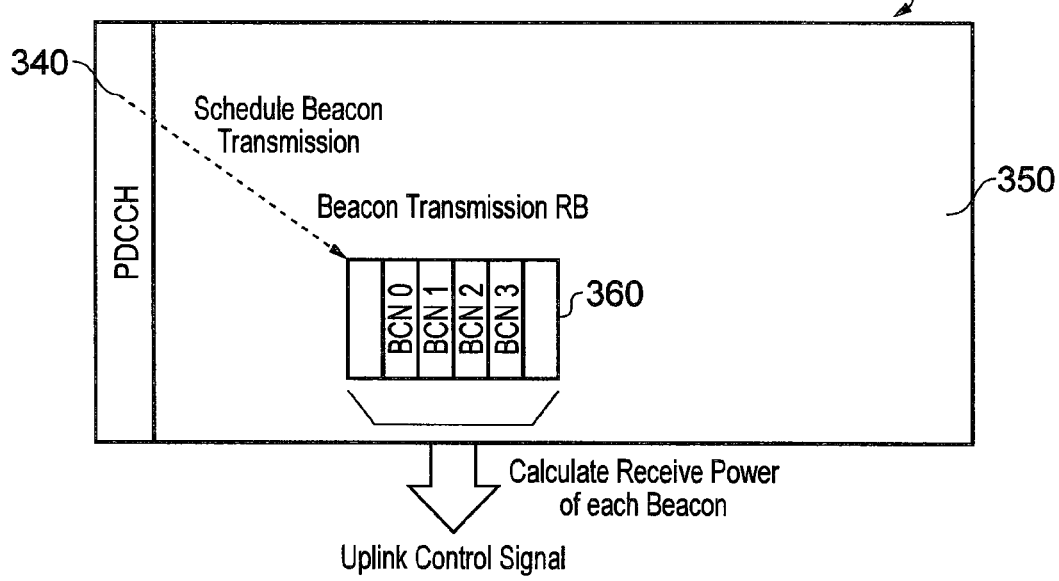
FIG. 11 schematically illustrates the use of the downlink control and data channels to control the transmission of beacon signals from various devices on the network.

FIG. 11 schematically illustrates the use of the downlink control and data channels to control the transmission of beacon signals from various devices on the network. In particular, control signalling provided within the PDCCH 340 of a sub-frame 330 indicates the radio resource (beacon transmission resource block) 360 within the PDSCH 350 at which respective beacon signals are to be transmitted. In this way the base station is able to schedule beacon transmissions in such a way that the network devices know when to transmit their beacon signals, and optionally when to receive beacon signals from neighbouring devices. Based on the beacon signals, which have a predetermined transmit power, the receiving device is able to calculate a receive power of each received beacon signal and communicate this back to the base station in the form of an uplink control signal carried on the PUCCH.

Figure 12:
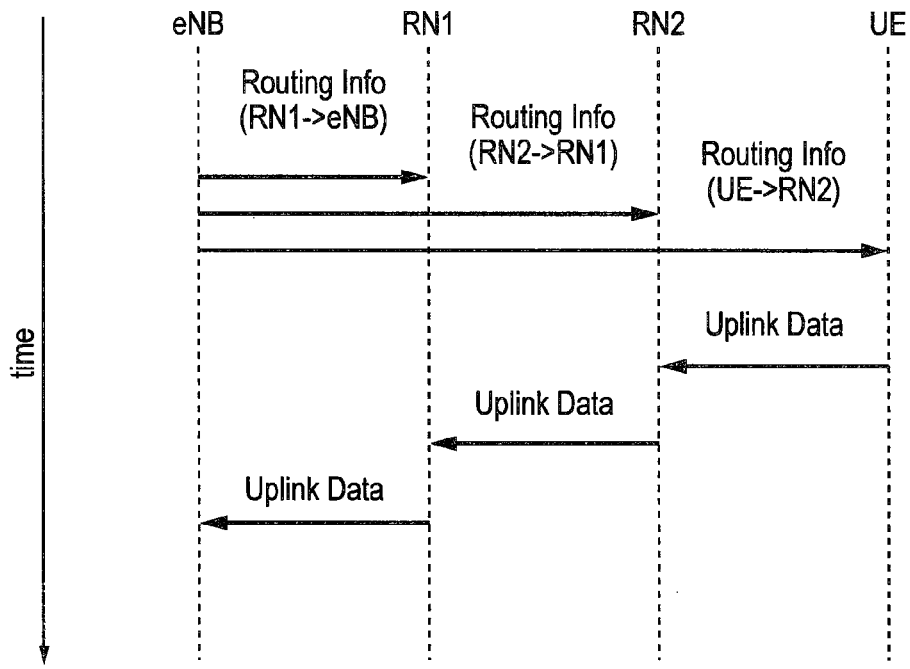
FIG. 12 schematically illustrates an example signal flow for setting an uplink data transfer route and providing uplink data in response.

Once the base station has decided on a suitable routing of uplink data from a terminal device, it transmits routing information to the terminal device and any intermediate devices on the decided route. The routing information may be broadcast by the base station using the PDCCH. FIG. 12 schematically illustrates an example signal flow for transmitting routing information and receiving uplink data along the nominated route in response. As can be seen from FIG. 12, three sets of routing information are transmitted, potentially in parallel, via the PDCCH to the first relay node (RN1), the second relay node (RN2) and the terminal device (UE). No multi-hopping on the downlink is required. The first set of routing information (RN1->eNB) is directed to the first relay node RN1 and instructs the first relay node RN1 to direct communications to the eNB. The second set of routing information (RN2->RN1) is directed to the second relay node RN2 and instructs the second relay node RN2 to direct communications to the first relay node RN1. The third set of routing information (UE->RN2) is directed to the mobile terminal (UE) and instructs the mobile terminal to direct communications to the second relay node RN2.

Subsequently, when the mobile terminal transmits data to the base station, it follows the instruction provided by the third set of routing information and directs the data to the second relay node RN2. The second relay node RN2 then follows the instruction provided by the second set of routing information and directs the data to the first relay node RN1. The first relay node RN1 then follows the instruction provided by the first set of routing information and directs the data to the base station. In this way the base station is able to control the routing of uplink data through the network. The routing information may utilise two addresses, that of the transmitter (so that the transmitter is aware that it is the intended recipient of the routing information), and of the receiver (so that the transmitter knows where to send the data). Where the routing information is broadcast on the PDCCH, the receiver address may also be useful to the receiver itself in knowing to expect transmissions from the transmitter. The addresses may be radio network temporary identifiers (RNTIs), which serve to identify various devices (including base stations, relays and terminal devices) within an LTE network environment.

Figure 13:
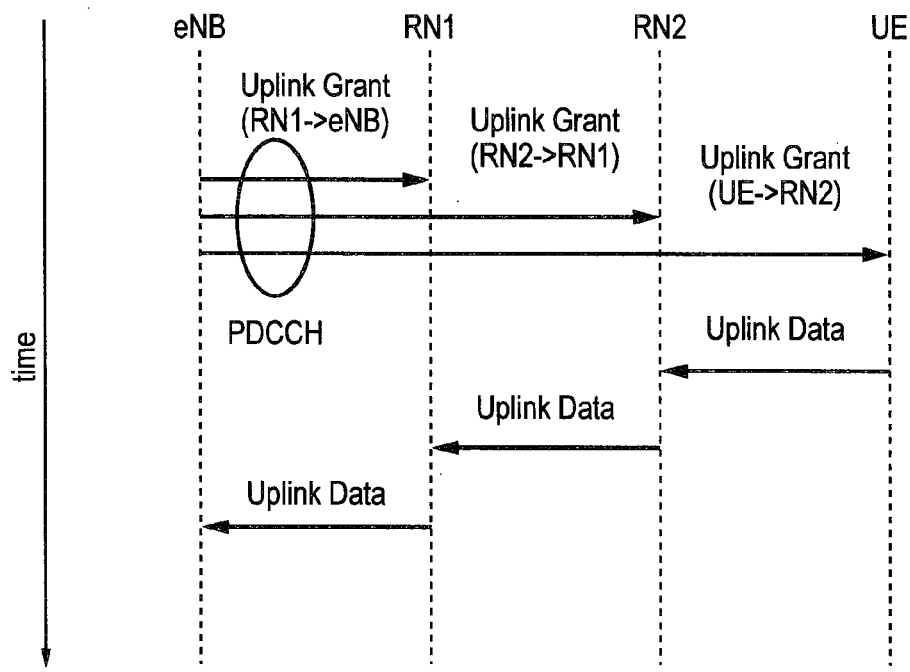
FIG. 13 schematically illustrates an example signal flow for allocating uplink resources and providing uplink data in response to that allocation.

FIG. 13 schematically illustrates an example signal flow for setting and scheduling uplink grants in relation to the selected radio links and providing uplink data in response to that allocation. The uplink grants are broadcast to each of the first relay node RN1, the second relay node RN2 and the mobile terminal (UE) (and in fact any other devices within range) on the PDCCH, but are addressed individually to these devices. No multi-hopping on the downlink is required. In response, the terminal device (UE) transmits uplink data to the second relay node RN2 (as required by the third routing information in FIG. 12) using the allocated radio resources. On receipt, the second relay node RN2 relays the received data to the first relay node (as required by the second routing information in FIG. 12) using the allocated radio resources. On receipt, the first relay node RN1 relays the received data to the base station (as required by the first routing information in FIG. 12) using the allocated radio resources. In this way, the base station is able to allocate radio resources on a per radio link basis. It will be appreciated that the signalling of FIGS. 12 and 13 could be combined, with the base station providing routing information and uplink grants in a single step.

Figure 14:
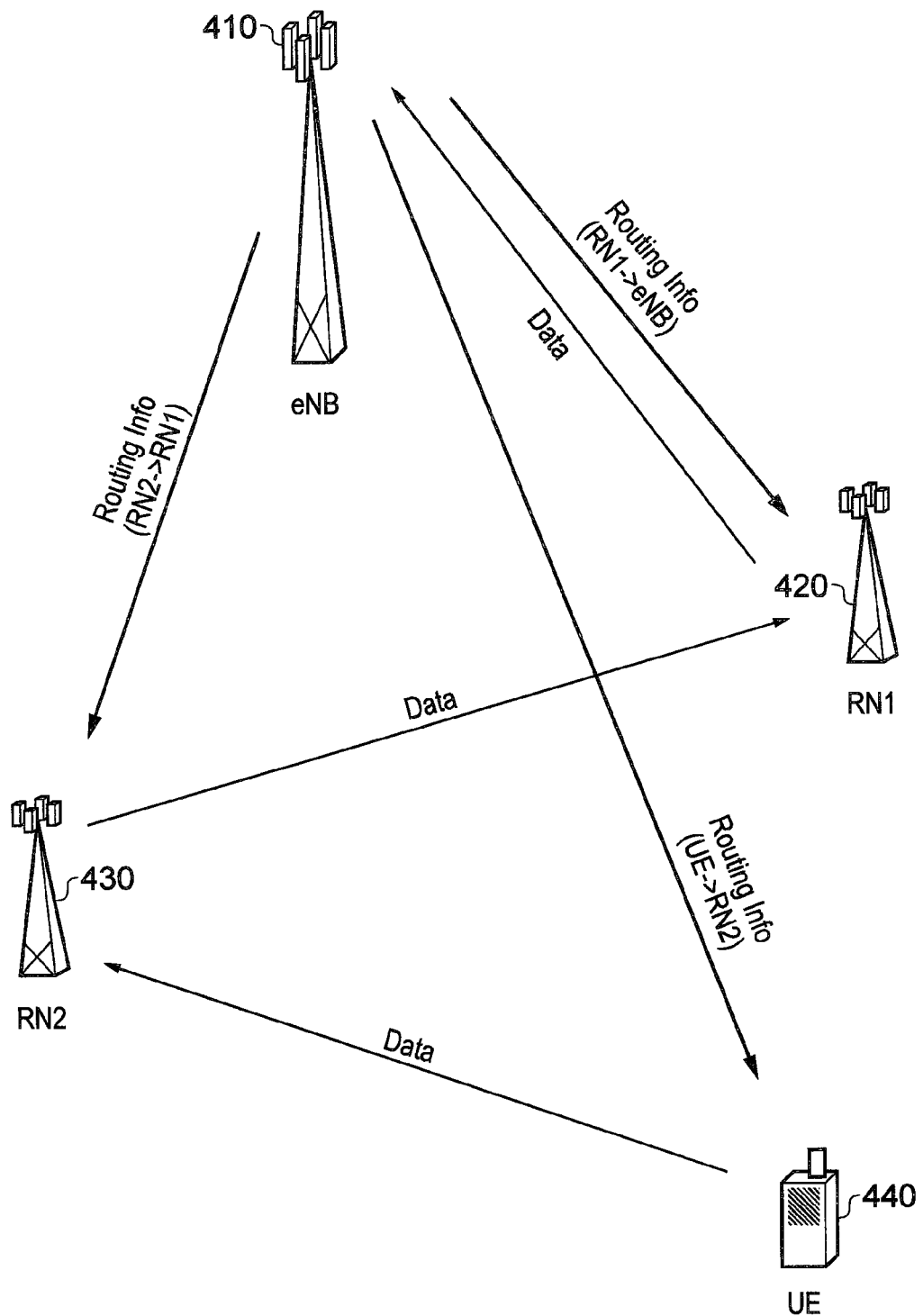
FIG. 14 schematically illustrates an example signal flow for routing information and data in a relay network.

FIG. 14 schematically illustrates an example signal flow for routing information and data in a relay network. FIG. 14 should be read in conjunction with FIG. 12. In FIG. 14, a base station (eNB) 410 is provided. The base station 410 transmits routing information on the downlink to each of a first relay node RN1 420, a second relay node RN2 430 and a mobile terminal (UE) 440. These devices correspond to the base station, first relay node, second relay node and base station discussed above in relation to FIG. 12. In the present case, the base station 410 is assumed to have previously determined the appropriate routing from the mobile terminal to the base station to be via the second relay node 430 and the first relay node 420 in series. As can be seen from FIG. 14, the base station sets this route by transmitting routing information on the downlink to each of the mobile terminal 440, the first relay node 420 and the second relay node 430. On the uplink side, data is transmitted in a multi-hop manner from the mobile terminal 440 to the second relay node 430, from the second relay node 430 to the first relay node 420 and from the first relay node 420 to the base station 410 in accordance with the respective routing information.

Figure 15:
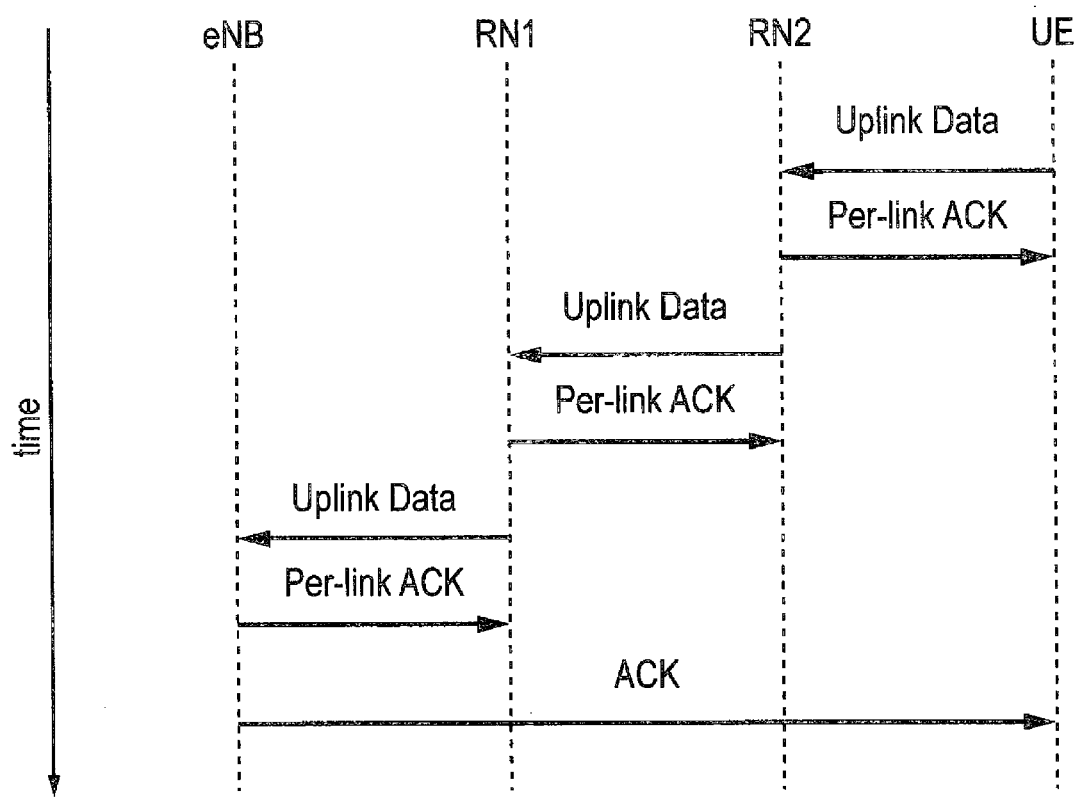
FIG. 15 schematically illustrates an example signal flow for a multi-hop acknowledgement (ACK) procedure.

FIG. 15 schematically illustrates an example signal flow for a multi-hop acknowledgement (ACK) procedure. FIG. 15 should be considered in conjunction with FIG. 14. When a transmitting device transmits data to a receiving device, it may expect an acknowledgment signal from the receiving device indicating that the transmitted data has arrived. If this acknowledgement signal is not received then the transmitting device may wish to resend the data (automatic repeat request—ARQ). A problem with a multi-hop routing scenario is that a per-radio-link acknowledgement cannot readily be enforced. In FIG. 15, when the mobile terminal (UE) transmits uplink data to the second relay node RN2, it can expect the second relay node to reply with a per-link ACK. However, this does not guarantee that the data will reach its final destination at the base station. Subsequent hops in the route may then be entirely invisible to the mobile terminal, with further per-link ACKs being transmitted only to the device providing the uplink data at each stage. These further per-link ACKs serve a useful function in that if they are not received a retransmission can be made from the first or second relay nodes for example. In order that the terminal device can know that the base station has received the uplink data, the base station transmits two ACK messages. One of these is transmitted to the first relay node in order that the first relay node is aware that the transmission of the uplink data has been successful. The first relay node can then dispense with the uplink data as there will be no requirement for retransmission. The other ACK message is transmitted directly to the terminal device. The terminal device is therefore made aware that the uplink data has reached its final destination at the base station, and can then dispense with the uplink data. Until that time there is a risk, even if the ACK message from the second relay node RN2 has been received, that the uplink data could be lost further along on the route to the base station. If the mobile terminal does not receive either the per-link ACK or the final ACK within respective specified time periods, it may decide to retransmit the uplink data.

In other words, in order to mitigate problems with automatic repeat requests, the base station (eNB) sends two Acknowledge messages for one received data message; a per-link ACK towards transmitter (relay node) of this data message and a further ACK towards the source (end UE) of the data message.

It should also be noted that the base station may determine a delay budget for uplink data transmission based on the number of intermediate devices via which uplink data transmissions from the terminal device to the base station are to be routed. The base station can use the determined delay budget to set a time-out period after which an uplink signal transmitted from the terminal device to the base station can be assumed to be lost. This time-out period can be communicated to the terminal device in control signalling, and enables the terminal device to determine (for example) how long to wait for an ACK message before retransmitting uplink data.

FIGS. 16A to 16I schematically illustrate an example method of establishing a multi-hop uplink using beacon signals. One example method of establishing an uplink multihop link is described in this section through a sample scenario, but it will be appreciated that other methods will also be viable. This method is described in relation to a mesh network, but would also be applicable to a relay network, in which certain of the UE devices would be replaced with a dedicated relay device.

Figure 16A:
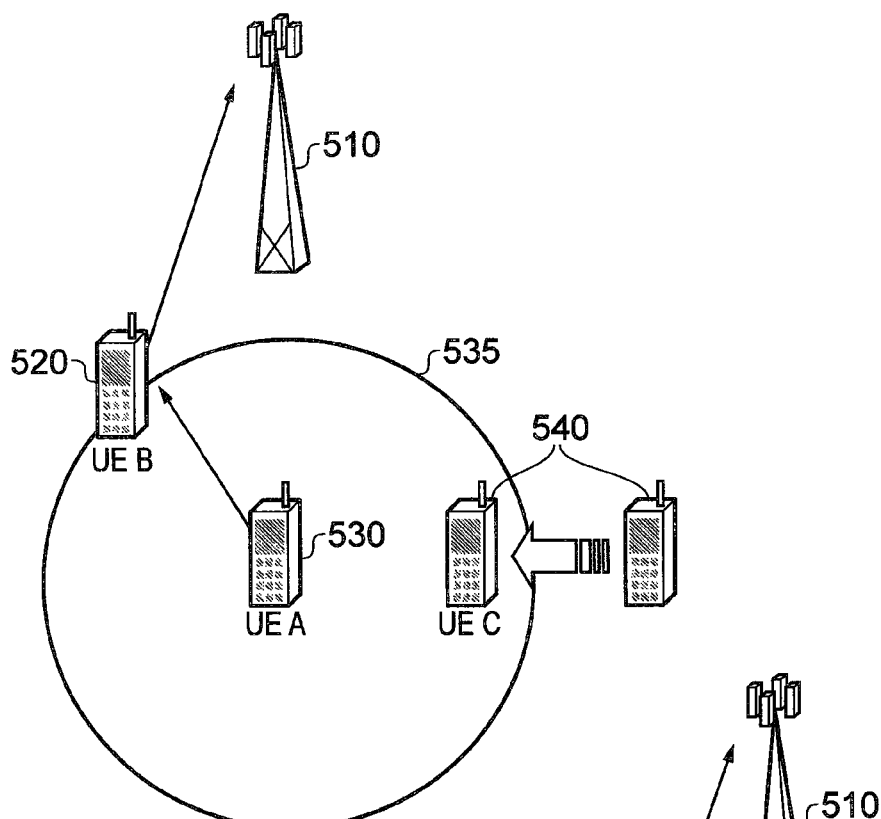
FIGS. 16A to 16I schematically illustrate an example method of establishing a multi-hop uplink.

Referring first to FIG. 16A, a terminal device UE A 530 is connected in the uplink to a base station eNB 510 via a terminal device UE B 520. The terminal device UE B 520 is directly connected to the base station eNB 510. The terminal device UE A 530 has a beacon transmission range indicated by the circle 535. A new terminal device UE C 540 enters in the radio (beacon) range of UE A.

Figure 16B:
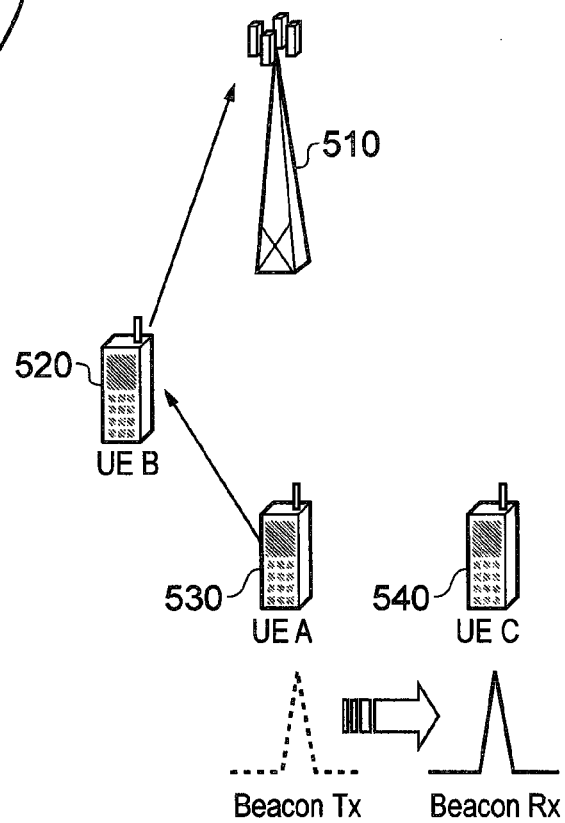

Referring next to FIG. 16B, the terminal device UE C 540, which wants to connect to the network, will listen for at least a predefined beacon interval, to hear if any terminal devices are nearby. Since the terminal device UE C 540 has entered the radio range 535 of the terminal device UE A 530, it will hear the beacon transmitted by the terminal device UE A 530.

If the terminal device UE C 540 hears more than one beacon it will measure the received power level of these to determine the strongest signal and store the strongest transmitting terminal device, because this can be assumed to be the closest terminal device suitable to connect to.

Figure 16C:
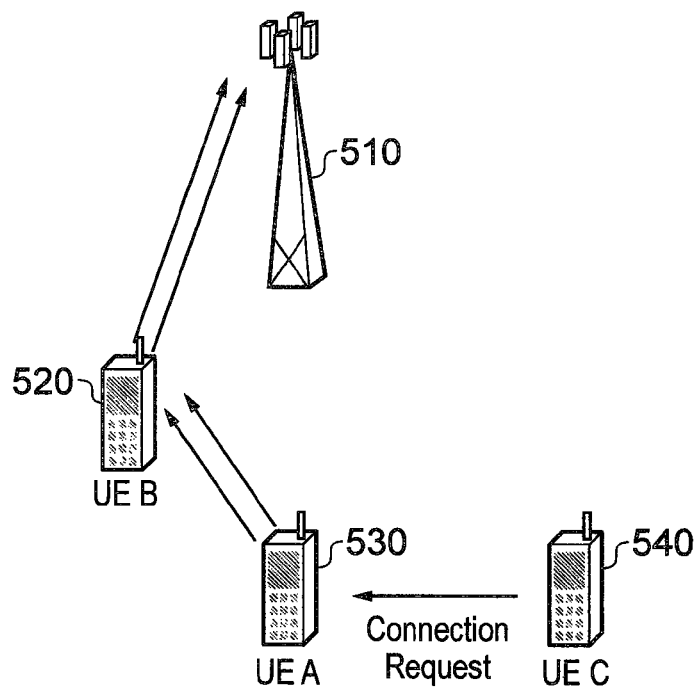

Referring next to FIG. 16C, once the terminal device UE C 540 receives the beacon sent from the terminal device UE A 530, it will send a connection request back to the terminal device UE A 530. If the terminal device UE C 540 hears more than one beacon, it will send the connection request to the terminal device that is assumed to be closest. The terminal devices UE A 530 and B 540 will forward this request to the base station eNB 510 where routing is managed.

Figure 16D:
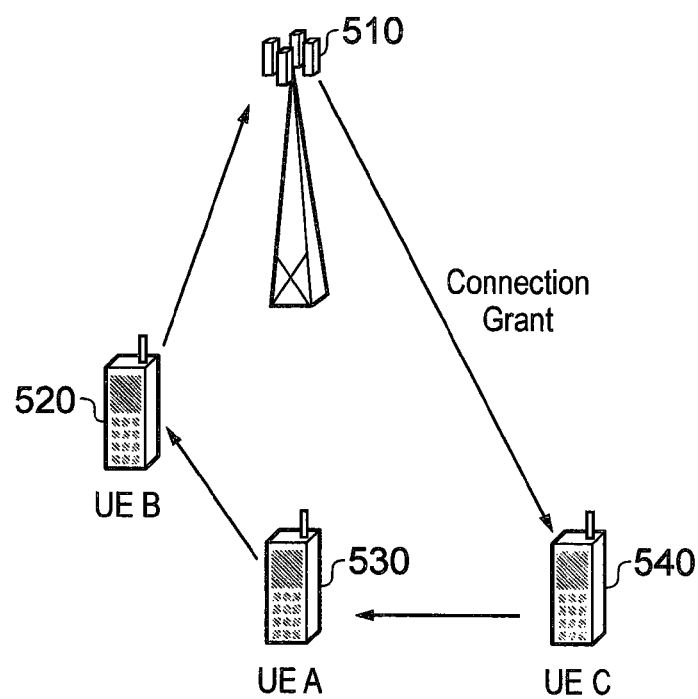

Referring next to FIG. 16D, upon reception of this request, the base station eNB 510 will send a connection grant message to directly to the terminal device UE C 540. The connection grant will instruct the terminal device UE C 540 to connect to the terminal device UE A 530, whenever it has something to send.

Figure 16E:
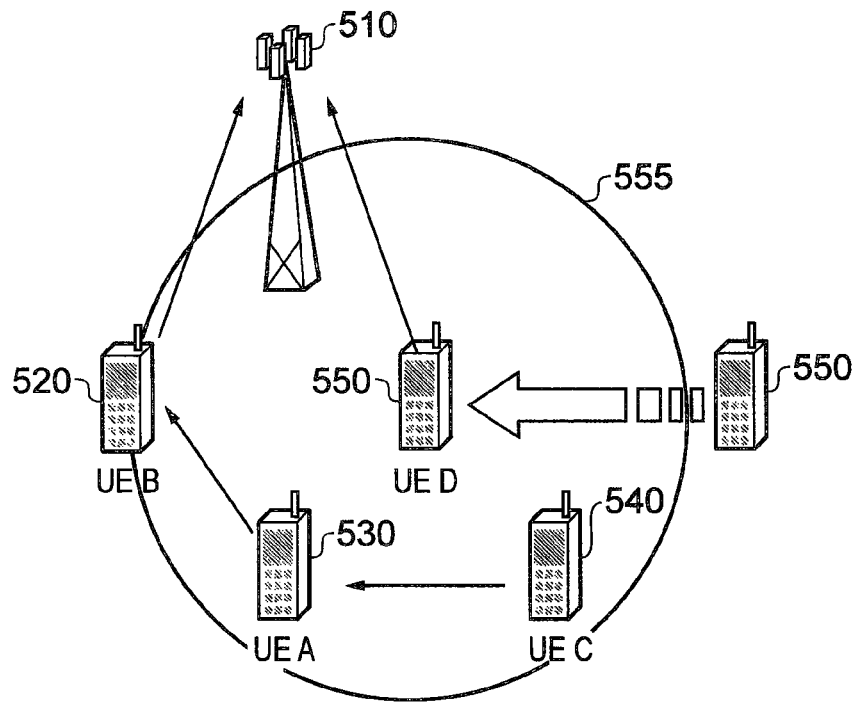

FIG. 16E assumes that another terminal device UE D 550, having a radio beacon range 555, roams into range of the terminal device UE C 540.

Figure 16F:
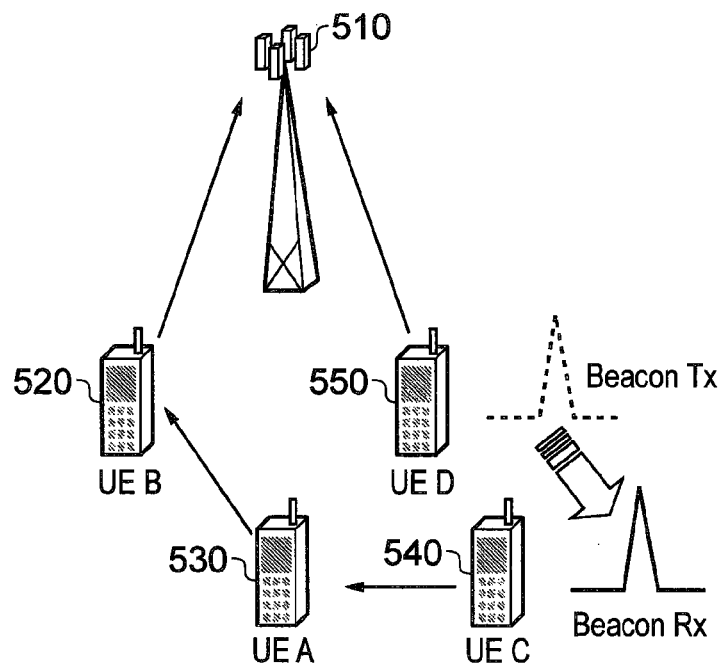

In FIG. 16F, an assumption is made that all terminal devices are sending beacons at a certain interval. Eventually the terminal device UE C 540 will hear the beacon sent from the terminal device UE D 550 and will notice that the terminal device UE D 550 has entered its radio range.

Figure 16G:
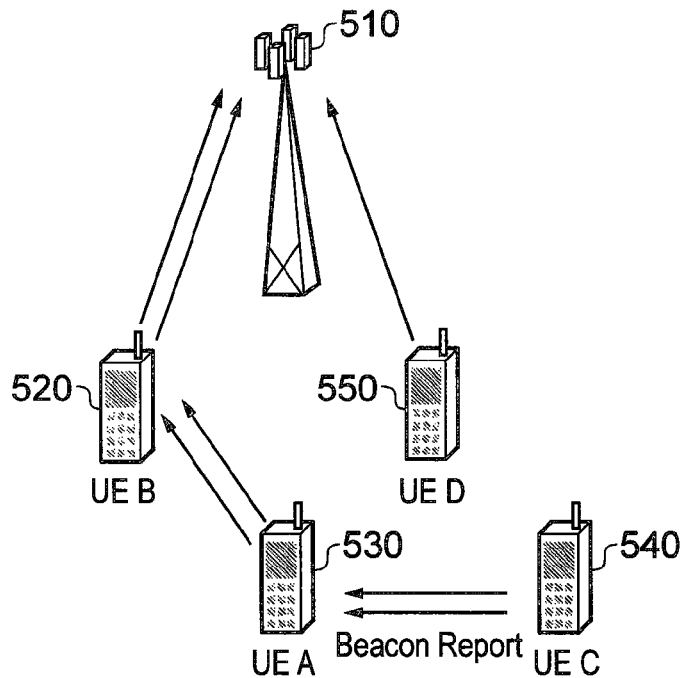

Referring to FIG. 16G, upon reception of a beacon, the terminal device UE C 540 will report this fact and indicate the strength of the signal to the base station eNB 510, through the already established uplink.

Figure 16H:
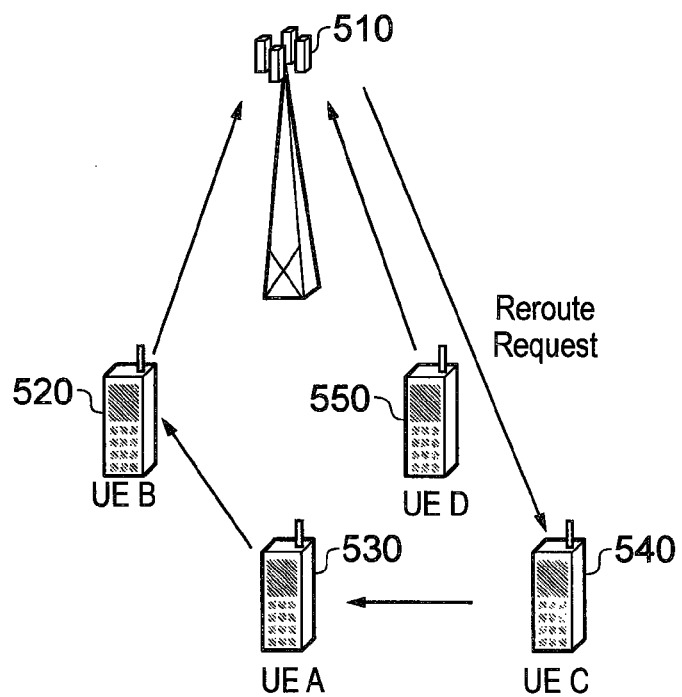

Referring to FIG. 16H, after reception of the beacon report, the base station eNB 510 will determine whether a change in the uplink route is necessary. The decision may be made from the reported signal strength between the mobile terminals or by the number of hops between the mobile terminal UE C 540 and the base station eNB 510.

Figure 16I:
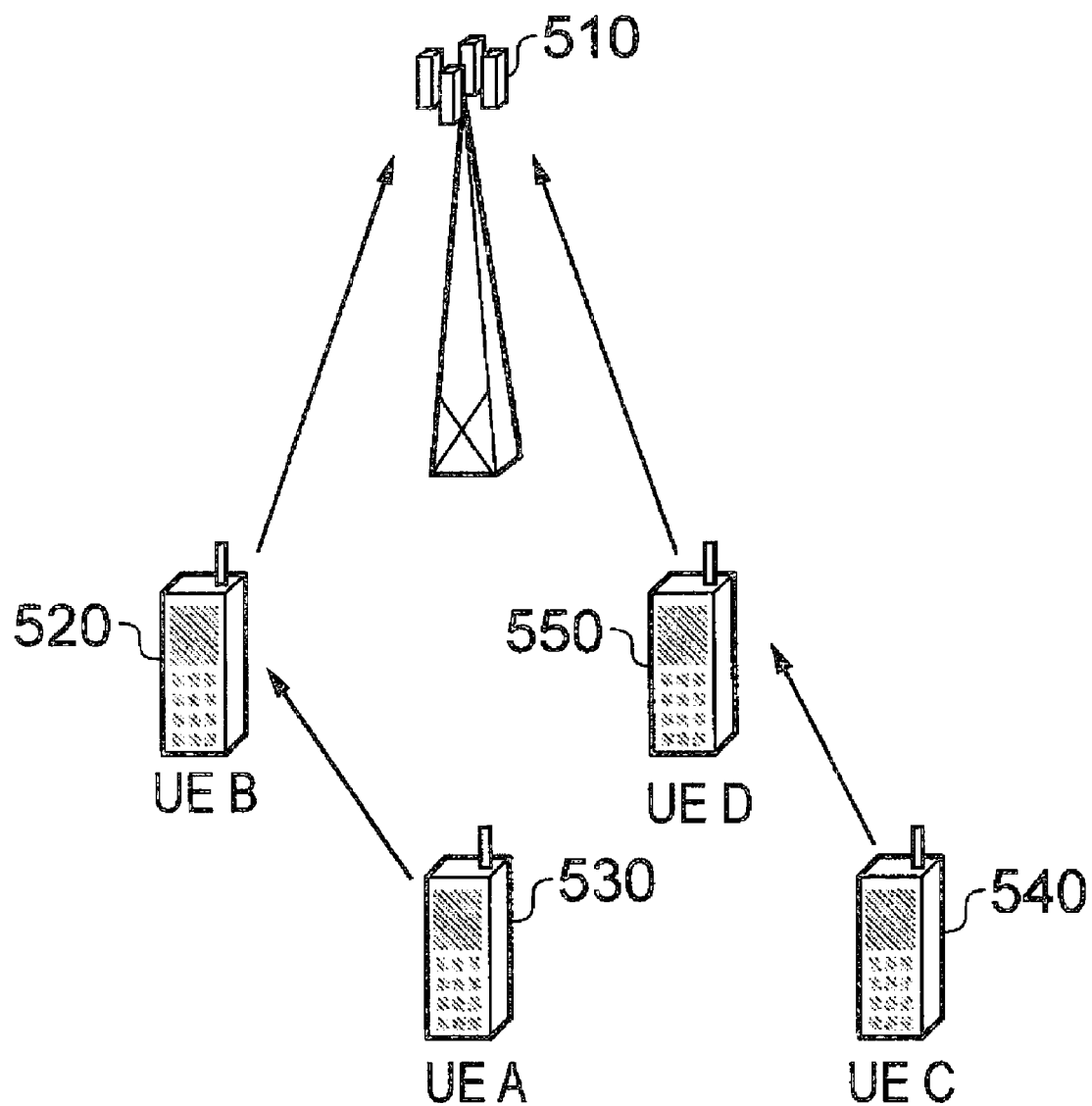

Referring to FIG. 16I, because the number of hops for the current route between the base station eNB 510 to the terminal device UE C 540 is 3 hops, and through the terminal device UE D 550 is 2 hops, the base station eNB 510 instructs the terminal device UE C 540 to reroute to connect with the terminal device UE D 550 to reduce the number of hops. Reducing the number of hops is beneficial to lower latency and overhead.

By operating through the method described with reference to FIGS. 16A to 16I, routing can be fully managed by the base station, enabling reduction of complexity at the mobile terminal.

Figure 17:
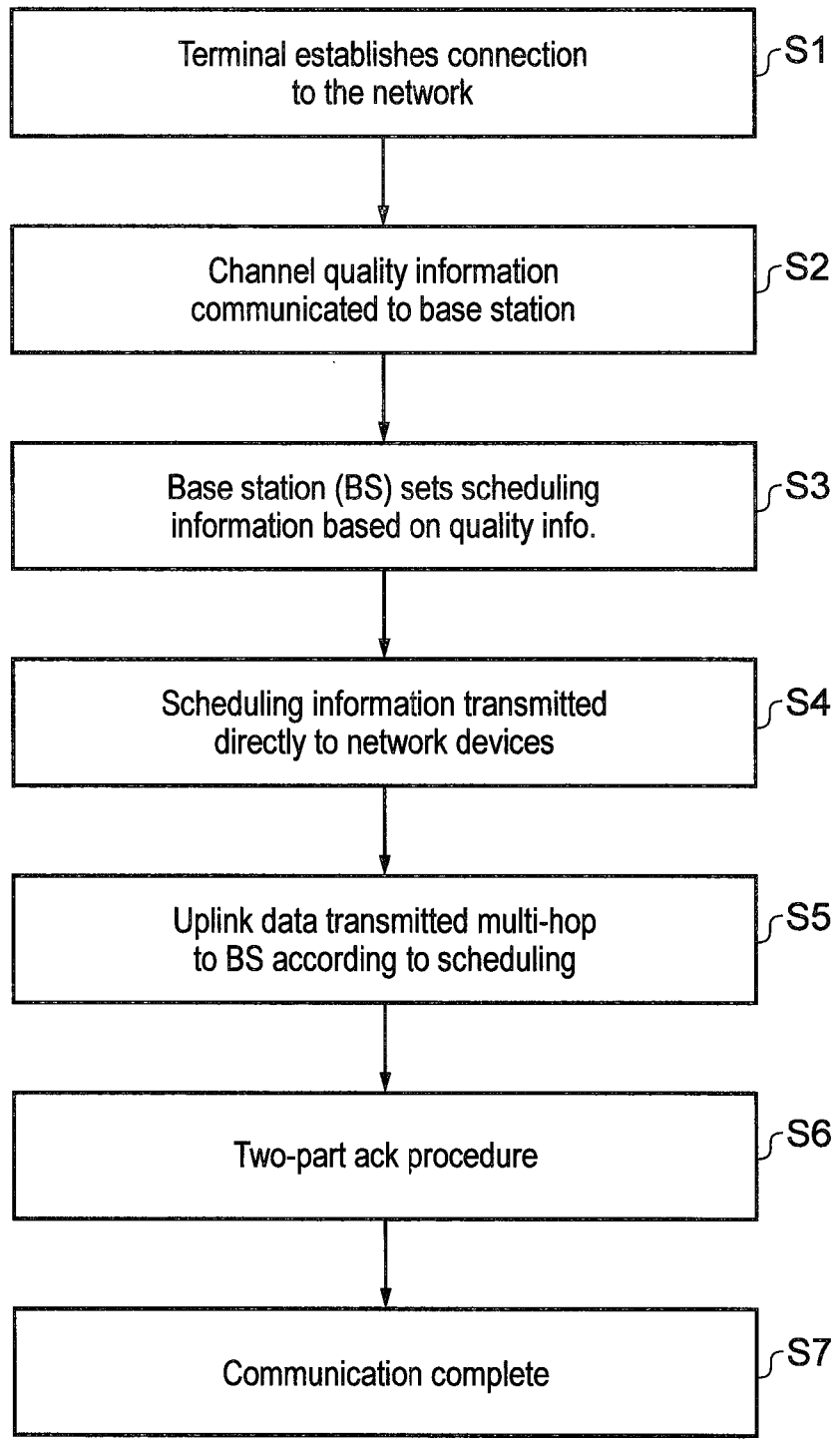
FIG. 17 is a schematic flow diagram illustrating several of the steps involved in communicating data asymmetrically on an uplink/downlink.

FIG. 17 is a schematic flow diagram illustrating several of the steps involved in communicating data asymmetrically on an uplink/downlink. In particular, at a step S1, a terminal device establishes a connection to the network. This could be achieved using the method described in relation to FIGS. 16A to 16D for example. Then, at a step S2, channel quality information, relating to the radio links available between devices within the network, is obtained and communicated to the base station. This could be achieved using the method described in relation to FIGS. 16E to 16G for example. At a step S3, the base station sets scheduling information (for example routing information and uplink grant) based on the received channel quality information. This could be achieved using the method described in relation to FIG. 16H for example. At a step S4, the base station transmits the scheduling information directly to the network devices. This could be achieved using the method described in relation to FIGS. 12 to 14, 16G and 16I for example. At a step S5, uplink data is transmitted in a multi-hop manner to the base station in accordance with the scheduling information. This could be achieved using the method described in relation to FIGS. 12 to 14 for example. At a step S6, a two-part acknowledgement (ACK) procedure is conducted to inform the terminal device that the uplink data has been successfully received at the base station. This could be achieved using the method described in relation to FIG. 15 for example. Finally, the communication is completed at a step S7.

The invention claimed is:

1. A wireless communications system, comprising:
   a base station;
   a plurality of intermediate devices; and
   a terminal device;
   wherein the base station is configured to wirelessly transmit downlink signals to the terminal device, the downlink signals comprising terminal control signals identifying a first intermediate device as a target device to which the terminal device is to direct uplink signals intended for the base station,
   wherein the terminal device is configured to wirelessly transmit the uplink signals to the base station via the first intermediate device identified by the terminal control signals,
   wherein, when the uplink signals from the terminal device to the base station are to be routed via more than one intermediate device, the base station is configured to wirelessly transmit intermediate control signals to the first intermediate device via which the uplink signals are to be routed from the terminal device to the base station, the intermediate control signals indicating a second intermediate device as a target device to which the first intermediate device is to direct the uplink signals, and
   wherein the first intermediate device is configured to wirelessly transmit the uplink signals received from the terminal device to the second intermediate device identified by the intermediate control signals.

2. The wireless communications system according to claim 1, wherein the base station is further configured to wirelessly transmit to the first intermediate device an indication that it is required to receive the uplink signals from the terminal device.

3. The wireless communications system according to claim 2, wherein the indication specifies a radio resource at which the first intermediate device can expect the uplink signals to be transmitted to the first intermediate device by the terminal device or by another intermediate device.

4. The wireless communications system according to claim 1, wherein the terminal control signals comprise scheduling information having more than one address field, the address fields comprising a transmitter address field identifying the terminal device and a receiver address field identifying the first intermediate device via which the uplink signals are to be transmitted.

5. The wireless communications system according to claim 1, wherein the intermediate control signals comprise scheduling information having more than one address field, the address fields comprising a transmitter address field identifying the first intermediate device and a receiver address field identifying the second intermediate device to which the first intermediate device is to direct uplink signals intended for the base station.

6. The wireless communications system according to claim 1, wherein the intermediate control signals comprise scheduling information having more than one address field, the address fields comprising a transmitter address field identifying the first intermediate device and a receiver address field identifying the second intermediate device.

7. The wireless communications system according to claim 4, wherein the address fields are radio network temporary identifiers (RNTIs): specified on a physical downlink control channel (PDCCH): broadcast by the base station.

8. The wireless communications system according to claim 1,
   wherein the intermediate devices are configured to generate respective predetermined beacon signals;
   wherein the terminal device is further configured to receive a beacon signal from an intermediate device and to generate a respective measure of the radio link quality between the terminal device and the intermediate device using the received beacon signals; and wherein the terminal device is further configured to transmit the measure of radio link quality to the base station within the uplink signals.

9. The wireless communications system according to claim 8,
wherein the terminal device is further configured to receive the beacon signals from plural intermediate devices and to generate, for each radio link between the terminal device and one of the intermediate devices from which a beacon signal has been received, a respective measure of the radio link quality using the received beacon signals; and
wherein the terminal device is further configured to transmit the respective measures of radio link quality to the base station within the uplink signals.

10. The wireless communications system according to claim 8, wherein the base station is further configured to determine a transmission route from the terminal device to the base station via one or more of the intermediate devices in dependence on the received measures of radio link quality.

11. The wireless communications system according to claim 1,
wherein one or more of the base station, the intermediate devices and the terminal device are further configured to generate respective predetermined beacon signals;
wherein another one or more of the base station, the intermediate devices and the terminal device are further configured to receive the beacon signals and to generate a respective measure of the radio link quality corresponding to the radio link via which the beacon signal has been transmitted using the received beacon signals;
wherein the another one or more of the base station, the intermediate devices and the terminal device are further configured to transmit the measure of radio link quality to the base station within the uplink signals; and
wherein the base station is further configured to determine a transmission route from the terminal device to the base station via one or more of the intermediate devices in dependence on the measures of radio link quality.

12. The wireless communications system according to claim 11, wherein the control signals comprise scheduling information, the scheduling information specifying one or more of a transmission power, data rate, transmission frequency, transmission timeslot and number of resource blocks for the uplink signals.

13. The wireless communications system according to claim 12, wherein the scheduling information is set by the base station for each radio link based on the radio link quality measure reported for each radio link.

14. The wireless communications system according to claim 11, wherein the base station is further configured to broadcast an indication of the radio resource over which each beacon signal is transmitted.

15. The wireless communications system according to claim 11,
wherein the uplink signals from the terminal device comprise uplink control signals indicating a radio link quality between the terminal device and neighbouring devices; and
wherein the base station is further configured to set one or more of an uplink route from the terminal device to the base station via one or more of the intermediate devices and transmission control parameters for controlling the transmission of data from each device in the uplink route in dependence on the received uplink control signals.

16. The wireless communications system according to claim 1,
wherein the intermediate devices are configured to generate respective predetermined beacon signals;
wherein the terminal device is further configured to receive a beacon signal from an intermediate device and to generate a respective measure of the radio link quality between the terminal device and the intermediate device using the received beacon signals;
wherein the terminal device is further configured to transmit the measure of radio link quality to the intermediate device; and
wherein the intermediate device is configured to relay the measure of radio link quality to the base station.

17. The wireless communications system according to claim 1, wherein in response to receiving uplink data signals from the terminal device via one or more intermediate devices, the base station is configured to transmit a first acknowledgement message to the intermediate device from which the uplink signals have been directly received, and to transmit a second acknowledgement message directly to the terminal device.

18. The wireless communications system according to claim 17,
wherein the intermediate device from which the uplink signals have been directly received is configured to retain the uplink signals until the first acknowledgement message has been received at the intermediate device; and
wherein the terminal device is further configured to retain the uplink signals until the second acknowledgement message has been received at the terminal device.

19. The wireless communications system according to claim 1, wherein the base station is further configured to determine a delay budget for uplink data transmission based on the number of intermediate devices via which uplink data transmissions from the terminal device to the base station are to be routed.

20. The wireless communications system according to claim 19, wherein the base station is further configured to set a time-out period after which an uplink signal transmitted from the terminal device to the base station can be assumed to be lost in dependence on the determined delay budget.

21. The wireless communications system according to claim 1, wherein at least one of the intermediate devices is a relay.

22. The wireless communications system according to claim 1, wherein at least one of the intermediate devices is another terminal device.

23. The wireless communications system according to claim 1, wherein the terminal device serves as an intermediate device in relation to uplink communications from another terminal device to the base station.

24. The wireless communications system according to claim 1, wherein the downlink signals comprise data signals.

25. A base station for wirelessly communicating data to and from a terminal device via one or more of a plurality of intermediate devices within a wireless communications system, the base station comprising:
a transmitter; and
circuitry configured to:
wirelessly transmit, via the transmitter, downlink signals to the terminal device, the downlink signals comprising terminal control signals indicating a first intermediate device as a target device to which the terminal device is to direct uplink signals intended for the base station; and receive uplink signals transmitted from the terminal device via the first intermediate device indicated by the terminal control signals, when the uplink signals from the terminal device to the base station are to be routed via more than one intermediate device, wirelessly transmit intermediate control signals to the first intermediate device via which the uplink signals are to be routed from the terminal device to the base station, the intermediate control signals indicating a second intermediate device as a target device to which the first intermediate device is to direct the uplink signals, and wherein the first intermediate device is configured to wirelessly transmit the uplink signals received from the terminal device to the second intermediate device identified by the intermediate control signals.

26. A method of wirelessly communicating data between a base station and a terminal device via one or more of a plurality of intermediate devices, comprising:

wirelessly transmitting, from the base station, downlink signals to the terminal device, the downlink signals comprising terminal control signals indicating a first intermediate device as a target device to which the terminal device is to direct uplink signals intended for the base station; and wirelessly transmitting, from the terminal device, the uplink signals to the base station via the first intermediate device indicated by the terminal control signals, wherein, when the uplink signals from the terminal device to the base station are to be routed via more than one intermediate device, wirelessly transmitting, from the base station, intermediate control signals to the first intermediate device via which the uplink signals are to be routed from the terminal device to the base station, the intermediate control signals indicating a second intermediate device as a target device to which the first intermediate device is to direct the uplink signals, and wirelessly transmitting, from the first intermediate device, the uplink signals received from the terminal device to the second intermediate device identified by the intermediate control signals.

27. The method of wirelessly communicating data according to claim 26, further comprising:

generating, at the intermediate devices, respective predetermined beacon signals;

receiving, at the terminal device, a beacon signal from an intermediate device and generating a respective measure of the radio link quality between the terminal device and the intermediate device using the received beacon signals; and transmitting, from the terminal device, the measure of radio link quality to the base station within the uplink signals.

28. The method of wirelessly communicating data according to claim 27, further comprising:

determining, at the base station, a transmission route from the terminal device to the base station via one or more of the intermediate devices in dependence on the received measures of radio link quality.

29. The method of wirelessly communicating data according to claim 26, further comprising, in response to receiving uplink data signals from the terminal device via one or more intermediate devices:

transmitting from the base station a first acknowledgement message to the intermediate device from which the uplink signals have been directly received, and transmitting from the base station a second acknowledgement message directly to the terminal device.

30. The method of wirelessly communicating data according to claim 29, further comprising:

retaining at the intermediate device from which the uplink signals have been directly received the uplink signals until the first acknowledgement message has been received at the intermediate device; and retaining at the terminal device the uplink signals until the second acknowledgement message has been received at the terminal device.

31. A method of wirelessly communicating data between a base station and a terminal device via one or more of a plurality of intermediate devices within a wireless communications system, comprising:

wirelessly transmitting downlink signals from the base station to the terminal device, the downlink signals comprising terminal control signals indicating a first intermediate device as a target device to which the terminal device is to direct uplink signals intended for the base station; and receiving, at the base station, uplink signals transmitted from the terminal device via the first intermediate device indicated by the terminal control signals, wherein, when the uplink signals from the terminal device to be base station are to be routed via more than one intermediate device, wirelessly transmitting, from the base station, intermediate control signals to the first intermediate device via which the uplink signals are to be routed from the terminal device to the base station, the intermediate control signals indicating a second intermediate device as a target device to which the first intermediate device is to direct the uplink signals, and wherein the first intermediate device is configured to wirelessly transmit the uplink signals received from the terminal device to the second intermediate device identified by the intermediate control signals.

* * * * *